(12) United States Patent
Mikoshiba et al.

(10) Patent No.: US 7,491,486 B2
(45) Date of Patent: Feb. 17, 2009

(54) OPTICAL INFORMATION RECORDING MEDIUM

(75) Inventors: Hisashi Mikoshiba, Kanagawa (JP); Tetsuya Watanabe, Kanagawa (JP); Kazutoshi Katayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 714 days.

(21) Appl. No.: 11/297,817

(22) Filed: Jul. 15, 2004

(65) Prior Publication Data
US 2006/0068326 A1    Mar. 30, 2006

(30) Foreign Application Priority Data
Jul. 16, 2003    (JP) .............................. 2003-275125

(51) Int. Cl.
*G11B 7/24*    (2006.01)
(52) U.S. Cl. .............................. 430/270.11; 430/270.13
(58) Field of Classification Search .................. 534/707, 534/628
See application file for complete search history.

(56) References Cited

U.S. PATENT DOCUMENTS

| | | | |
|---|---|---|---|
| 4,412,231 A * | 10/1983 | Namba et al. ............ | 346/135.1 |
| 6,307,671 B1 | 10/2001 | Yabuki | |
| 6,969,764 B2 | 11/2005 | Ogiso et al. | |
| 2002/0076648 A1 | 6/2002 | Berneth et al. | |
| 2002/0127367 A1 * | 9/2002 | Shibata ...................... | 428/64.4 |
| 2003/0068577 A1 | 4/2003 | Liao et al. | |
| 2003/0148216 A1 * | 8/2003 | Wang et al. ............ | 430/270.16 |

FOREIGN PATENT DOCUMENTS

| | | |
|---|---|---|
| JP | 8-99467 A | 4/1996 |
| JP | 2000-108513 A | 4/2000 |
| JP | 2000-113504 A | 4/2000 |
| JP | 2000-149320 A | 5/2000 |
| JP | 2000-158818 A | 6/2000 |
| JP | 2000163800 | 6/2000 |
| JP | 2000-218940 A | 8/2000 |
| JP | 2000-222771 A | 8/2000 |
| JP | 2000-222772 A | 8/2000 |
| JP | 2000-263939 A | 9/2000 |
| JP | 2000-280620 A | 10/2000 |
| JP | 2000-280621 A | 10/2000 |
| JP | 2000-318312 A | 11/2000 |
| JP | 2000-318313 A | 11/2000 |
| JP | 2001-039034 A | 2/2001 |
| JP | 2001-147319 A | 5/2001 |
| JP | 2001-253171 A | 9/2001 |
| JP | 2001-287460 A | 10/2001 |
| JP | 2001-287465 A | 10/2001 |
| JP | 2002-301870 A | 10/2002 |
| JP | 2002-307826 A | 10/2002 |
| WO | 02/083662 A2 | 10/2002 |
| WO | WO 02/083795 * | 10/2002 |

OTHER PUBLICATIONS

European Search Report dated Aug. 23, 2007.
Communication from Japanese Patent Office dated Feb. 5, 2008.

* cited by examiner

*Primary Examiner*—Mark F Huff
*Assistant Examiner*—Anna L Verderame
(74) *Attorney, Agent, or Firm*—Sughrue Mion, PLLC

(57) ABSTRACT

The present invention provides an optical information recording medium comprising a substrate having provided thereon a recording layer in which information can be recorded by laser light irradiation, wherein the recording layer contains a dye represented by the following formula (I):

$$\text{Dye} - (\text{L} - \text{UV})_m \qquad \text{Formula (I)}$$

wherein Dye represents a dye residue having a molar extinction coefficient of 10000 ($cm^{-1} \cdot mol^{-1}$) or more for light having a wavelength of 450 nm to 900 nm; L represents a divalent connecting group or a single bond; UV represents a dye residue having a molar extinction coefficient of 10000 ($cm^{-1} \cdot mol^{-1}$) or more for light having a wavelength of 280 nm to 450 nm; and m denotes an integer from 1 to 8.

10 Claims, 3 Drawing Sheets

DYE 1

COMPARATIVE DYE A

OPTICAL INFORMATION RECORDING MEDIUM

CROSS-REFERENCE TO RELATED APPLICATION

This application claims priority under 35 USC 119 from Japanese Patent Application No. 2003-275125, the disclosure of which is incorporated by reference herein.

BACKGROUND OF THE INVENTION

1. Field of the Invention

The present invention relates to an optical information recording medium, which can record and reproduce information by using laser light. The invention particularly relates to a heat-mode type optical information recording medium which contains an azo dye having a specific structure and is suitable for recording information with laser light.

2. Description of the Related Art

Optical information recording media (optical disks) capable of recording information only once with laser light have been known. These optical disks are also called write-once CDs (so-called CD-Rs) and are typically structured to have a recording layer made of an organic dye, a light reflecting layer made of a metal such as gold, and a protective layer made of a resin. These are laminated in this order on a transparent disk substrate. Information is recorded by irradiating the CD-R with near-infrared laser light (usually laser light having a wavelength in the vicinity of 780 nm). The irradiated portions of the recording layer absorb the light, and the temperature in those portions rises, causing a physical or chemical change (for example, generation of pits). This changes the optical characteristics of the irradiated portions, and information is thus recorded. The reading (i.e., reproduction) of information is carried out by irradiating the CD-R with laser light having the same wavelength as the laser light used for recording, and the information is reproduced by detecting the difference between reflectance in the recorded portions where the optical characteristics have been changed and the unrecorded portions where the optical characteristics have not been changed in the recording layer.

In recent years, there has been a need for an optical information recording medium having a higher recording density. To meet this demand, optical disks called write once digital versatile disks (so-called DVD-Rs) have become commercially available. DVD-Rs have a structure in which two disks are bonded to each other with an adhesive. These disks are usually obtained by disposing a recording layer made of a dye, a light reflecting layer, and, if necessary, a protective layer in this order on a transparent disk substrate having a guide groove (pre-groove) for laser light irradiated to track having a width (0.74 to 0.8 µm) of less than half of the width of the guide groove of a CD-R. The disks are bonded to each other such that the recording layers face inside. Alternatively, DVD-Rs have another structure in which the disk and a disk-shaped protective substrate having the same shape as the disk are bonded to each other with an adhesive such that the recording layer faces inside. Information is recorded and reproduced by irradiating the DVD-R with visible light (usually laser light having a wavelength range of 630 nm to 680 nm). DVD-Rs make it possible to record at higher densities than CD-Rs.

In recent years, networks such as the Internet and high-vision TV have been spreading rapidly. There has also been an increased demand for large capacity recording media that can record image information simply at low cost with High Definition Television (HDTV) broadcasting near at hand. The DVD-R satisfies the demand for a large capacity recording medium to some extent, however, it does not have enough recording capacity to cope with future needs. For this reason, optical disks are being developed that have improved recording density by using laser light having shorter wavelengths than the laser light used for DVD-Rs. This endows the disks with larger recording capacities. For example, an optical recording disk called a Blue-ray system using a 405 nm blue laser light has been placed on the market.

A recording and reproducing method is disclosed in which an optical information recording medium provided with a recording layer having an organic dye is irradiated from the recording layer side to the optical reflecting layer side with laser light having a wavelength of 530 nm or less to thereby record and reproduce information. Specifically, an information recording and reproducing method has been proposed in which an optical disk using a porphyrin compound, an azo dye, a metal azo dye, a quinophthalone dye, a trimethinecyanine dye, a dicyanovinylphenyl skeleton dye, a cumarin compound, or a naphthalocyanine compound as the dye of the recording layer is irradiated with blue (wavelength: 400 to 430 nm or 488 nm) or bluish green (wavelength: 515 nm) laser light to record and reproduce information.

Various dyes have been proposed as the dye for these optical disks using a blue light-emitting laser (see, for example, Japanese Patent Application Laid-Open (JP-A) Nos. 2001-287460, 2001-287465, 2001-253171, 2001-39034, 2000-318313, 2000-318312, 2000-280621, 2000-280620, 2000-263939, 2000-222772, 2000-222771, 2000-218940, 2000-158818, 2000-149320, 2000-108513, 2000-113504, 2002-301870 and 2001-287465, and U.S. Patent Laid-Open No. 2002/0076648A1).

Nonetheless, the inventors of the present invention have discovered that optical disks using the known dyes described in the above Patent References require further improvement. This is due to the fact that these disks do not reach the level at which recording characteristics such as reflectance and degree of modulation are satisfactory and also, these disks have unsatisfactory storage stability.

In the meantime, in order to produce an optical disk at low cost, it is preferable to use a production method in which a dye is dissolved in a solvent to prepare ink (i.e., coating solution), and the ink is then applied to a substrate by spin coating. However, when the dye used for an optical disk has insufficient solubility or dissolution stability in the solvent, it is impossible to produce an optical disk using the dye with this production method including coating. Also, this method has problems concerning the coatability of the dye and drying load when producing an optical disk. The performance of an optical disk is largely dependent on the structure and properties of the dye. The dye necessary to read and write information with light having a wavelength of 450 nm or less must have absorption in the ultraviolet region and a large refractive index at the wavelength of writing light. However, many such dyes have a low molar extinction coefficient and low solubility in a solvent for coating solutions, and none of these dyes satisfy requirements for optical disks. If the structure of the dye is modified to introduce a substituent improving volubility in a dye molecule, the molecular weight of the dye increases, which resultantly drops the refractive index of the dye film. Conventionally, it is difficult to satisfy the demand for both high solubility and high refractive index.

Also, many dyes having absorption in the ultraviolet region have low fastness to light, humidity, temperature and atmosphere. If the fastness can be improved, dyes that have high molar extinction coefficients but have not been put to practical use because of their low fastness can be put to practical use.

Therefore, it is necessary to develop an optical information recording medium that has excellent recording characteristics and can record and reproduce information at high density by laser irradiation, particularly with laser light having a wavelength of 450 nm or less.

Also, these is a need for an optical information recording medium that is stable in high-temperature and high-humidity conditions, and can store recorded information for a long period of time.

Moreover, there is a need for an optical information recording medium having improved dye solubility, coatability, and drying load which are typically problematic when producing disks.

SUMMARY OF THE INVENTION

The inventors of the present invention have found that the above demand can be met by using a dye which has a specific structure and have completed the invention. Specifically, the inventors have made earnest studies. As a result, the inventors have found that a dye in which a UV absorbing dye which has low solubility and which absorbs light having a wavelength of 280 nm to 450 nm and a dye which absorbs light having a wavelength of 450 nm to 900 nm are bonded to each other with a covalent bond has improved solubility and can form a uniform dye film without local generation of crystals. Also, the inventors have found that the dye has improved fastness to light, humidity and temperature.

The invention provides an optical information recording medium comprising a substrate having provided thereon a recording layer in which information can be recorded by laser light irradiation, wherein the recording layer contains a dye represented by the following formula (I):

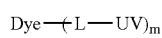

Formula (I)

wherein Dye represents a dye residue having a molar extinction coefficient of 10000 $(cm^{-1} \cdot mol^{-1})$ or more for light having a wavelength of 450 nm to 900 nm; L represents a divalent connecting group or a single bond; UV represents a dye residue having a molar extinction coefficient of 10000 $(cm^{-1} \cdot mol^{-1})$ or more for light having a wavelength of 280 nm to 450 nm; and m denotes an integer from 1 to 8.

The invention can provide an optical information recording medium in which information can be recorded at high density and from which the information can be reproduced by irradiating laser light, particularly laser light having a wavelength of 450 nm or less and which has excellent recording characteristics.

Also, the invention can provide an optical information recording medium which is stable with respect to a high temperature and high humidity and which can store recorded information for a long period of time.

Further, the invention can provide an optical information recording medium having improved dye solubility, coatability, and drying load which are problematic when producing disks.

DETAILED DESCRIPTION OF THE INVENTION

Figure 1:
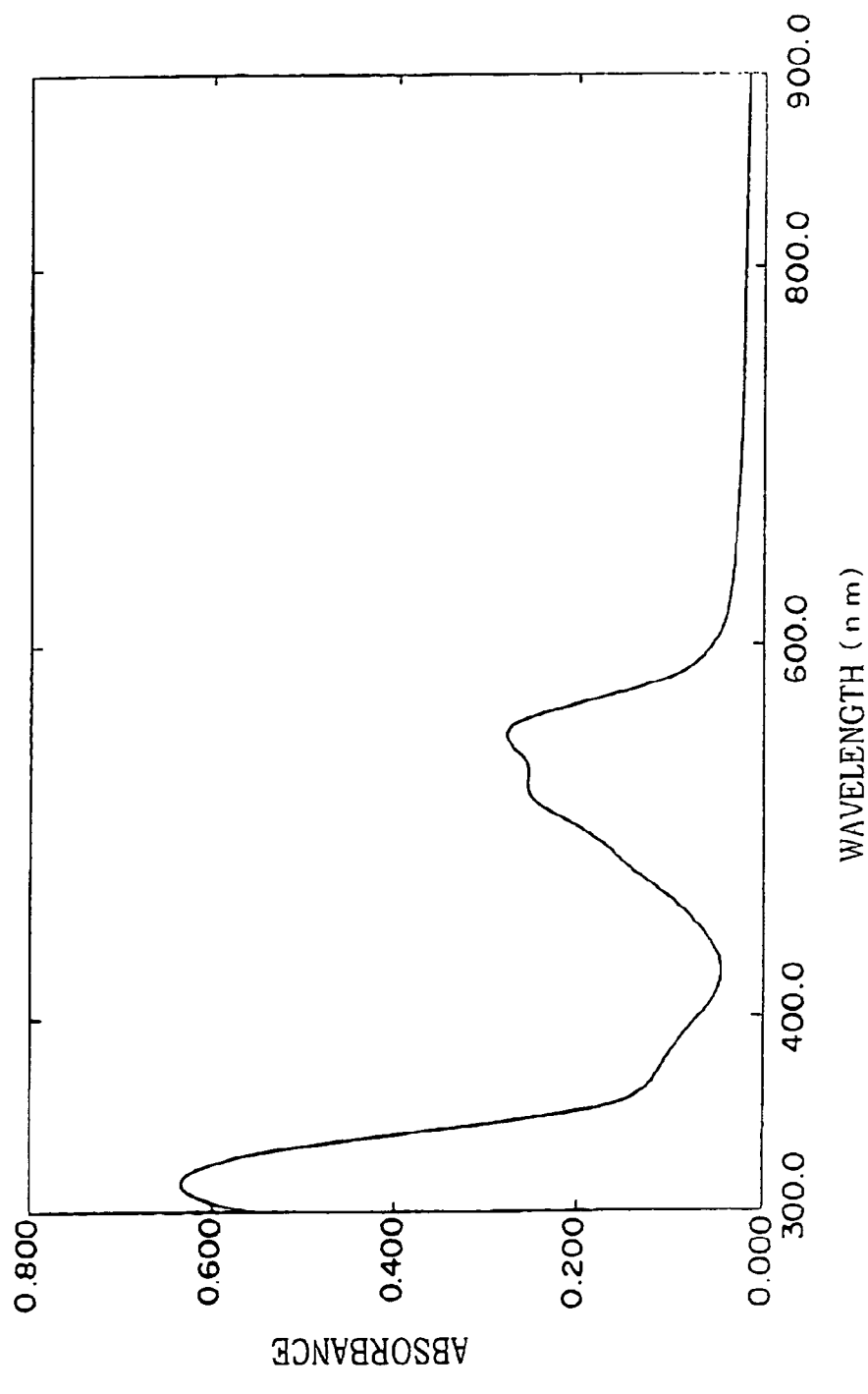
FIG. 1 is a graph showing absorption spectra of a film made of dye 1.

The optical information recording medium of the invention will be hereinafter explained in detail.

The optical information recording medium of the invention has, on a substrate, a recording layer in which information can be recorded by laser light irradiation, and the recording layer contains a dye represented by the following formula (I).

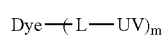

Formula (I)

In formula (I), Dye represents a dye residue having an absorption of 10000 $(cm^{-1} \cdot mol^{-1})$ or more as a molar extinction coefficient for light having a wavelength of 450 nm to 900 nm; L represents a divalent connecting group or a single bond: UV represents a dye residue having an absorption of 10000 $(cm^{-1} \cdot mol^{-1})$ or more as a molar extinction coefficient for light having a wavelength of 280 nm to 450 nm; and m denotes an integer of from 1 to 8.

Dye in formula (I) will be explained in detail.

Dye represents a dye residue having absorption of 10000 $(cm^{-1} \cdot mol^{-1})$ or more as a molar extinction coefficient for light having a wavelength of 450 nm to 900 nm. The dye residue preferably has a maximum absorption wavelength of 450 nm to 900 nm and more preferably 500 nm to 900 nm. If the maximum absorption wavelength is less than 450 nm, the dye has large absorption in the wavelength range of about 400 to about 420 nm. Therefore, when blue laser light is used to record information, the reflectance of the dye at the recording wavelength is low, leading to deteriorated recording performance. If the maximum absorption wavelength exceeds 900 nm, such Dye has a complicated and huge structure, and therefore the dye is unstable and production cost of the dye is high.

The molar extinction coefficient of Dye is preferably 10000 $(cm^{-1} \cdot mol^{-1})$ to 200000 $(cm^{-1} \cdot mol^{-1})$, more preferably 10000 $(cm^{-1} \cdot mol^{-1})$ to 100000 $(cm^{-1} \cdot mol^{-1})$ and most preferably 30000 $(cm^{-1} \cdot mol^{-1})$ to 100000 $(cm^{-1} \cdot mol^{-1})$.

Dye is preferably selected from the group consisting of azo dyes, large ring dyes, anthraquinone dyes, methine dyes and azomethine dyes.

As the large ring dyes, phthalocyanine, naphthalocyanine, porphyrin, azaporphyrin and porphyrazine are preferable. Among these compounds, phthalocyanine is the most preferable.

As the methine dyes, cyanine, merocyanine, oxonol and hemicyanine are preferable.

The azo dye may be either a so-called azo chelating dye containing a metal ion, or a non-chelating dye. When importance is imposed on high light fastness, a chelating dye is preferable. The metal ion which is concerned in chelating is preferably Ni, Cu, Zn, Al, Ti, Fe, B, Cr, or Co. When the number of ligands is insufficient for a center metal ion and therefore the ligands and the center metal ion cannot form a stable complex in forming a chelating structure, a molecule or molecules other than a dye are preferably added to the complex as a ligand to form a stable chelating dye. The ligand added separately is preferably a compound containing at least one of nitrogen, oxygen and sulfur atoms. Among such compounds, amine (aniline) compounds and heterocyclic compounds containing at least one nitrogen atom are preferable.

Dye preferably has a structure represented by the following formula (II).

A-N=N—B  Formula (II)

In formula (II), A and B independently represent an aromatic ring or a hetero ring. A is preferably a so-called coupler component which reacts with a diazonium salt to be converted to A in the dye of formula (II) after the diazo coupling reaction. Examples of the coupler component include hydrocarbon type aromatic rings such as a benzene ring and a naphthalene ring, and hetero rings. As the aromatic ring, those having a hydroxyl group, or a substituted or unsubstituted amino group is preferable from the viewpoint of high reactivity with a diazonium salt. As the hetero ring, a five-membered hetero ring having a nitrogen atom and 1 to 20 carbon atoms or a six-membered ring having a nitrogen atom and 2 to 20 carbon atoms is preferable. Among these structures, the structure represented by A is preferably any of those represented by the following formulae (IV) to (XVIII).

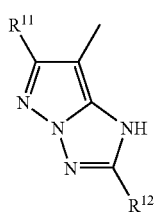
Formula (IV)

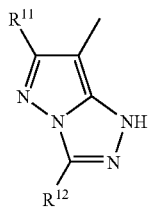
Formula (V)

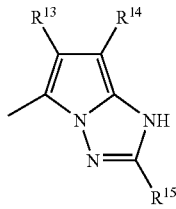
Formula (VI)

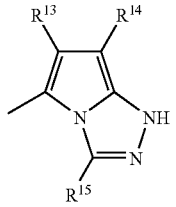
Formula (VII)

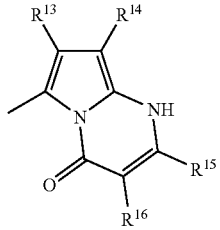
Formula (VIII)

-continued

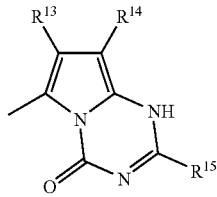
Formula (IX)

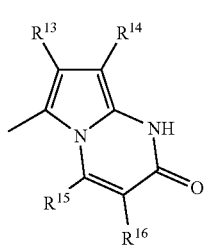
Formula (X)

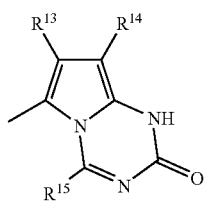
Formula (XI)

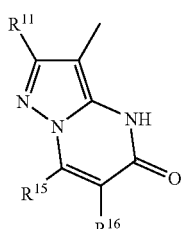
Formula (XII)

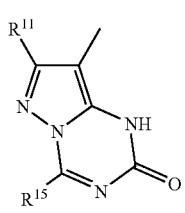
Formula (XIII)

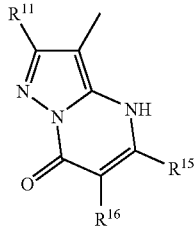
Formula (XIV)

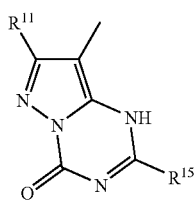
Formula (XV)

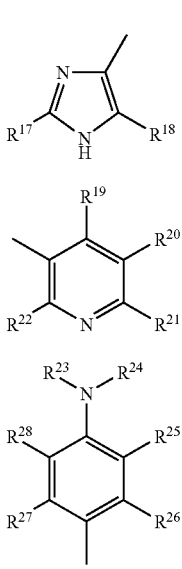

Formula (XVI)

Formula (XVII)

Formula (XVIII)

In formula (IV) to (XVIII), $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ independently represent a hydrogen atom or a substituent. The substituent will be explained below in detail.

When $R^{11}$ to $R^{28}$ are substituents, examples of the substituent include halogen atoms, alkyl groups (including cycloalkyl groups and bicycloalkyl groups), alkenyl groups (including cycloalkenyl groups and bicycloalkenyl groups), alkynyl groups, aryl groups, heterocyclic groups, a cyano group, a hydroxyl group, a nitro group, a carboxyl group, alkoxy groups, aryloxy groups, silyloxy groups, heterocyclic oxy groups, acyloxy groups, carbamoyloxy groups, alkoxycarbonyloxy groups, aryloxycarbonyloxy groups, amino groups (including anilino groups), acylamino groups, aminocarbonylamino groups, alkoxycarbonylamino groups, aryloxycarbonylamino groups, sulfamoylamino groups, alkylsulfonylamino groups, arylsulfonylamino groups, a mercapto group, alkylthio groups, arylthio groups, heterocyclic thio groups, sulfamoyl groups, a sulfo group, alkylsulfinyl groups, arylsulfinyl groups, alkylsulfonyl groups, arylsulfonyl groups, acyl groups, aryloxycarbonyl groups, alkoxycarbonyl groups, carbamoyl groups, arylazo groups, heterocyclic azo groups, imide groups, phosphino groups, phosphinyl groups, phosphinyloxy groups, phosphinylamino groups and silyl groups.

More specifically, $R^{11}$ to $R^{28}$ independently represent a halogen atom (for example, a chlorine atom, a bromine atom or an iodine atom); an alkyl group (e.g. a linear, branched or cyclic substituted or unsubstituted alkyl group, which includes alkyl groups (preferably, alkyl groups having 1 to 30 carbon atoms, for example, methyl, ethyl, n-propyl, isopropyl, t-butyl, n-octyl, eicosyl, 2-chloroethyl, 2-cyanoethyl and 2-ethylhexyl groups), cycloalkyl groups (preferably substituted or unsubstituted cycloalkyl groups having 3 to 30 carbon atoms, for example, cyclohexyl, cyclopentyl and 4-n-dodecylcyclohexyl groups), bicycloalkyl groups (preferably, substituted or unsubstituted bicycloalkyl groups having 5 to 30 carbon atoms, namely, monovalent groups obtained by removing one hydrogen atom from a bicycloalkane having 5 to 30 carbon atoms, for example, bicyclo[1,2,2]heptane-2-yl and bicyclo[2,2,2]octane-3-yl groups), and tricyclo structures having many cyclic structures, and the alkyl group in the substituent (for example, an alkyl group in an alkylthio group) which is explained below representing alkyl groups having the above mentioned concept); an alkenyl group (namely, a linear, branched or cyclic substituted or unsubstituted alkenyl group, which includes alkenyl groups (preferably substituted or unsubstituted alkenyl groups having 2 to 30 carbon groups, for example, vinyl, allyl, prenyl, geranyl and oleyl groups), cycloalkenyl groups (preferably substituted or unsubstituted cycloalkenyl groups having 3 to 30 carbon atoms, namely, monovalent groups obtained by removing one hydrogen atom from cycloalkenes having 3 to 30 carbon atoms, for example, 2-cyclopentene-1-yl and 2-cyclohexene-1-yl groups), and bicycloalkenyl groups (substituted or unsubstituted bicycloalkenyl groups and preferably substituted or unsubstituted bicycloalkenyl groups having 5 to 30 carbon atoms, namely, monovalent groups obtained by removing one hydrogen atom from bicycloalkenes having one double bond, for example, bicyclo[2,2,1]hept-2-ene-1-yl and bicyclo[2,2,2]oct-2-ene-4-yl groups)); an alkynyl group (preferably, a substituted or unsubstituted alkynyl group having 2 to 30 carbon atoms, for example, ethynyl, propargyl and trimethylsilylethynyl groups); an aryl group (preferably a substituted or unsubstituted aryl group having 6 to 30 carbon atoms, for example, phenyl, p-tolyl, naphthyl, m-chlorophenyl and o-hexadecanoylaminophenyl groups); a heterocyclic group (preferably a monovalent group obtained by removing one hydrogen atom from a five-membered or six-membered substituted or unsubstituted aromatic or non-aromatic compound and more preferably a five-membered or six-membered aromatic heterocyclic group having 3 to 30 carbon atoms, for example, 2-furyl, 2-thienyl, 2-pyrimidinyl and 2-benzothiazolyl groups); a cyano group; a hydroxyl group; a nitro group; a carboxyl group; an alkoxy group (preferably, a substituted or unsubstituted alkoxy group having 1 to 30 carbon atoms, for example, methoxy, ethoxy, isopropoxy, t-butoxy, n-octyloxy and 2-methoxyethoxy groups); an aryloxy group (preferably a substituted or unsubstituted aryloxy group having 6 to 30 carbon atoms, for example, phenoxy, 2-methylphenoxy, 4-t-butylphenoxy, 3-nitrophenoxy and 2-tetradecanoylaminophenoxy groups); a silyloxy group (preferably a silyloxy group having 3 to 20 carbon atom, for example, trimethylsilyloxy and t-butyldimethylsilyloxy groups); a heterocyclic oxy group (preferably a substituted or unsubstituted heterocyclic oxy group having 2 to 30 carbon atoms, for example, 1-phenyltetrazole-5-oxy and 2-tetrahydropyranyloxy groups); an acyloxy group (preferably a formyloxy group, a substituted or unsubstituted alkylcarbonyloxy group having 2 to 30 carbon atoms, or a substituted or unsubstituted arylcarbonyloxy group having 6 to 30 carbon atoms, for example, formyloxy, acetyloxy, pivaloyloxy, stearoyloxy, benzoyloxy and p-methoxyphenylcarbonyloxy groups); a carbamoyloxy group (preferably a substituted or unsubstituted carbamoyloxy group having 1 to 30 carbon atoms, for example, N,N-dimethylcarbamoyloxy, N,N-diethylcarbamoyloxy, morpholinocarbonyloxy, N,N-di-n-octylaminocarbonyloxy and N-n-octylcarbamoyloxy groups); an alkoxycarbonyloxy group (preferably a substituted or unsubstituted alkoxycarbonyloxy group having 2 to 30 carbon atoms, for example, methoxycarbonyloxy, ethoxycarbonyloxy, t-butoxycarbonyloxy and n-octylcarbonyloxy groups); an aryloxycarbonyloxy group (preferably a substituted or unsubstituted aryloxycarbonyloxy group having 7 to 30 carbon atoms, for example, phenoxycarbonyloxy, p-methoxyphenoxycarbonyloxy and p-n-hexadecyloxyphenoxycarbonyloxy groups); an amino group (preferably an amino group, a substituted or unsubstituted alkylamino group having 1 to 30 carbon atoms or a substituted or unsubstituted anilino group having 6 to 30 carbon atoms, for example, amino, methylamino, dimethylamino, anilino, N-methylanilino and diphenylamino groups); an acylamino group (preferably a formylamino group, a substituted or unsubstituted alkylcarbonylamino group having 1 to 30 carbon atoms or a substituted or unsubstituted arylcarbonylamino group having 6 to 30 carbon atoms, for example, formylamino, acetylamino, pivaloylamino, lauroylamino, benzoylamino and 3,4,5-tri-n-octyloxyphenylcarbonylamino groups; an aminocarbonylamino group (preferably a substituted or unsubstituted aminocarbonylamino group having 1 to 30 carbon atoms, for example, carbamoylamino, N,N-dimethylaminocarbonylamino, N,N-diethylaminocarbonylamino and morpholinocarbonylamino groups); an alkoxycarbonylamino group (preferably a substituted or unsubstituted alkoxycarbonylamino group having 2 to 30 carbon atoms, for example, methoxycarbonylamino, ethoxycarbonylamino, t-butoxycarbonylamino, n-octadecyloxycarbonylamino and N-methyl-methoxycarbonylamino groups); an aryloxycarbonylamino group (preferably a substituted or unsubstituted aryloxycarbonyl group having 7 to 30 carbon atoms, for example, phenoxycarbonylamino, p-chlorophenoxycarbonylamino and m-n-octyloxyphenoxycarbonylamino groups); a sulfamoylamino group (preferably a substituted or unsubstituted sulfamoylamino group having 0 to 30 carbon atoms, for example, sulfamoylamino, N,N-dimethylaminosulfonylamino and N-n-octylaminosulfonylamino groups); an alkylsulfonylamino or an arylsulfonylamino group (preferably a substituted or unsubstituted alkylsulfonylamino group having 1 to 30 carbon atoms or a substituted or unsubstituted arylsulfonylamino group having 6 to 30 carbon atoms, for example, methylsulfonylamino, butylsulfonylamino, phenylsulfonylamino, 2,3,5-trichlorophenylsulfoulylamino and p-methylphenylsulfonylamino groups); a mercapto group; an alkylthio group (preferably a substituted or unsubstituted alkylthio group having 1 to 30 carbon atoms, for example, methylthio, ethylthio and n-hexadecylthio groups); an arylthio group (preferably a substituted or unsubstituted arylthio group having 6 to 30 carbon atoms, for example, phenylthio, p-chlorophenylthio and m-methoxyphenylthio groups); a heterocyclic thio group (preferably a substituted or unsubstituted heterocyclic thio group having 2 to 30 carbon atoms, for example, 2-benzothiazolylthio and 1-phenyltetrazole-5-ylthio groups); a sulfamoyl group (preferably a substituted or unsubstituted sulfamoyl group having 0 to 30 carbon atoms, for example, N-ethylsulfamoyl, N-(3-dodecyloxypropyl)sulfamoyl, N,N-dimethylsulfamoyl, N-acetylsulfamoyl, N-benzoylsulfamoyl and N-(N'-phenylcarbamoyl)sulfamoyl group); a sulfo group; an alkylsulfinyl group or an arylsulfinyl group (preferably a substituted or unsubstituted alkylsulfinyl group having 1 to 30 carbon atoms or a substituted or unsubstituted arylsulfinyl group having 6 to 30 carbon atoms, for example, methylsulfinyl, ethylsulfinyl, phenylsulfinyl and p-methylphenylsulfinyl groups); an alkylsulfonyl group or an arylsulfonyl group (preferably a substituted or unsubstituted alkylsulfonyl group having 1 to 30 carbon atoms or a substituted or unsubstituted arylsulfonyl group having 6 to 30 carbon atoms, for example, methylsulfonyl, ethylsulfonyl, phenylsulfonyl and p-methylphenylsulfonyl groups); an acyl group (preferably a formyl group, a substituted or unsubstituted alkylcarbonyl group having 2 to 30 carbon atoms, a substituted or unsubstituted arylcarbonyl group having 7 to 30 carbon atoms or a substituted or unsubstituted heterocyclic carbonyl group having 4 to 30 carbon atoms which includes a carbon atom bonding to a carbonyl group, for example, acetyl, pivaloyl, 2-chloroacetyl, stearoyl, benzoyl, p-n-octyloxyphenylcarbonyl, 2-pyridylcarbonyl and 2-furylcarbonyl groups); an aryloxycarbonyl group (preferably a substituted or unsubstituted aryloxycarbonyl group having 7 to 30 carbon atoms, for example, phenoxycarbonyl, o-chlorophenoxycarbonyl, m-nitrophenoxycarbonyl and p-t-butylphenoxycarbonyl groups); an alkoxycarbonyl group (preferably a substituted or unsubstituted alkoxycarbonyl group having 2 to 30 carbon atoms, for example, methoxycarbonyl, ethoxycarbonyl, t-butoxycarbonyl and n-octadecyloxycarbonyl groups); a carbamoyl group (preferably a substituted or unsubstituted carbamoyl group having 1 to 30 carbon atoms, for example, carbamoyl, N-methylcarbamoyl, N,N-dimethylcarbamoyl, N,N-di-n-octylcarbamoyl and N-(methylsulfonyl)carbamoyl groups); an arylazo group or a heterocyclic azo group (preferably a substituted or unsubstituted arylazo group having 6 to 30 carbon atoms or a substituted or unsubstituted heterocyclic azo group having 3 to 30 carbon atoms, for example, phenylazo, p-chlorophenylazo and 5-ethylthio-1,3,4-thiadiazole-2-ylazo groups); an imide group (preferably N-succinimide and N-phthalimide groups); a phosphino group (preferably a substituted or unsubstituted phosphino group having 2 to 30 carbon atoms, for example, dimethylphosphino, diphenylphosphino and methylphenoxyphosphino groups); a phosphinyl group (preferably a substituted or unsubstituted phosphinyl group having 2 to 30 carbon atoms, for example, phosphinyl, dioctyloxyphosphinyl and diethoxyphosphinyl groups); a phosphinyloxy group (preferably a substituted or unsubstituted phosphinyloxy group having 2 to 30 carbon atoms, for example, diphenoxyphosphinyloxy and dioctyloxyphosphinyloxy groups); a phosphinylamino group (preferably a substituted or unsubstituted phosphinylamino group having 2 to 30 carbon atoms, for example, dimethoxyphosphinylamino and dimethylaminophosphinylamino groups); or a silyl group (preferably a substituted or unsubstituted silyl group having 3 to 30 carbon atoms, for example, trimethylsilyl, t-butyldimethylsilyl and phenyldimethylsilyl groups).

Among the above functional groups, those having a hydrogen atom may be further substituted by substituting any of the aforementioned groups for the hydrogen atom. Examples of such a functional group include an alkylcarbonylaminosulfonyl group, an arylcarbonylaminosulfonyl group, an alkylsulfonylaminocarbonyl group and an arylsulfonylaminocarbonyl group. Specific examples of the functional group include a methylsulfonylaminocarbonyl group, a p-methylphenylsulfonylaminocarbonyl group, an acetyl aminosulfonyl group and a benzoylaminosulfonyl group.

In formulae (IV) and (V), $R^{11}$ and $R^{12}$ are independently preferably a substituted or unsubstituted alkyl group or a substituted or unsubstituted aryl group.

In formulae (VI) and (VII), $R^{13}$ and $R^{14}$ are preferably an electron-attractive group and more preferably a substituent having a Hammett substituent constant σp of 0.3 or more. $R^{13}$ and $R^{14}$ are independently preferably a cyano group or a substituted or unsubstituted alkoxycarbonyl group. It is more preferable that $R^{13}$ be a cyano group and that $R^{14}$ be an alkoxycarbonyl group. $R_{13}$ is preferably a substituted or unsubstituted alkyl group or a substituted or unsubstituted aryl group.

In formulae (VIII), (X), (XII) and (XIV), $R^{13}$ and $R^{14}$ are preferably an electron-attractive group and more preferably a substituent having a Hammett substituent constant σp of 0.3 or more. $R^{13}$ and $R^{14}$ are preferably a cyano group or a substituted or unsubstituted alkoxycarbonyl group. It is more preferable that $R^{13}$ be a cyano group and that $R^{14}$ be a substituted or unsubstituted alkoxycarbonyl group. $R^{15}$ and $R^{16}$ are independently preferably a substituted or unsubstituted alkoxy group, a substituted or unsubstituted amino group, a substituted or unsubstituted alkoxycarbonyl group, a substituted or unsubstituted carbamoyl group, a substituted or unsubstituted alkyl group or a substituted or unsubstituted aryl group.

In formulae (IX), (XI), (XIII) and (XV), $R^{13}$ and $R^{14}$ are preferably an electron-attractive group and more preferably a substituent having a Hammett substituent constant σp of 0.3 or more. $R^{13}$ and $R^{14}$ are preferably a cyano group, or a substituted or unsubstituted alkoxycarbonyl group. It is more preferable that $R^{13}$ be a cyano group and that $R^{14}$ be a substituted or unsubstituted alkoxycarbonyl group.

$R^{15}$ is preferably a hydrogen atom, a substituted or unsubstituted alkoxy group, a substituted or unsubstituted amino group, a substituted or unsubstituted alkoxycarbonyl group, a substituted or unsubstituted carbamoyl group, a substituted or unsubstituted alkyl group, or a substituted or unsubstituted aryl group.

In formula (XVI), $R^{17}$ and $R^{18}$ are independently a substituted or unsubstituted aryl group, a substituted or unsubstituted alkyl group, a substituted or unsubstituted acylamino group, a substituted or unsubstituted carbamoyl group, or a substituted or unsubstituted alkoxycarbonyl group.

In formula (XVII), $R^{19}$ is preferably a hydrogen atom, a substituted or unsubstituted alkyl group, or a substituted or unsubstituted alkyl group, and $R^{20}$ represents a hydrogen atom, a cyano group, a substituted or unsubstituted carbamoyl group, or a substituted or unsubstituted alkoxycarbonyl group, and $R^{21}$ and $R^{22}$ are independently preferably a hydrogen atom, a substituted or unsubstituted amino group (including an anilino group), or a substituted or unsubstituted alkoxy group.

In formula (XVII), $R^{21}$ and $R^{22}$ are preferably a hydroxyl group or a substituted or unsubstituted amino group (including an anilino group), and $R^{19}$ is preferably a substituted or unsubstituted alkyl group, or a substituted or unsubstituted aryl group. $R^{20}$ is preferably a cyano group, a hydrogen atom, an alkoxycarbonyl group or a carbamoyl group.

In formula (XVIII), $R^{23}$ and $R^{24}$ are preferably a hydrogen atom or a substituted or unsubstituted alkyl group. $R^{25}$, $R^{26}$, $R^{27}$ and $R^{28}$ are independently preferably a hydrogen atom, a substituted or unsubstituted alkyl group, a substituted or unsubstituted alkoxy group, a substituted or unsubstituted acylamino group, a halogen atom, or a substituted or unsubstituted carbamoyl group.

Among the cyclic structures represented by A, the structures represented by formula (XVII) or (XVIII) are preferable. Among these structures, the structure represented by formula (XVII) is the most preferable.

Next, B in formula (II) will be explained in detail. B represents a substituted or unsubstituted aryl group or a substituted or unsubstituted heterocyclic group which can be derived from diazonium salts. Namely, B is a so-called diazo component. The diazo component means a partial structure which can be introduced by converting a heterocyclic compound or a benzene derivative both having an amino group as a substituent into a diazo compound (diazonium salt) and by conducting diazo coupling reaction between the diazo compound and a coupler and which is frequently used in the field of azo dyes. In other words, B is a substituent, which is a monovalent group by eliminating an amino group from an amino-substituted heterocyclic compound or benzene derivative which can be involved with diazotization reaction.

Examples of the monovalent heterocyclic group include the following compounds (A-1) to (A-25).

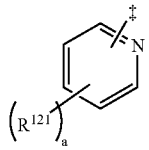 (A-1)

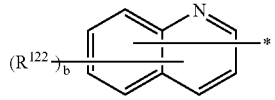 (A-2)

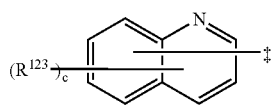 (A-3)

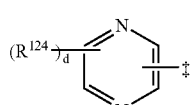 (A-4)

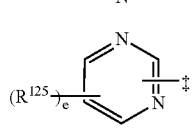 (A-5)

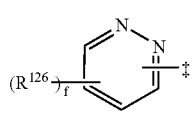 (A-6)

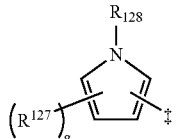 (A-7)

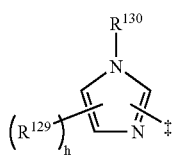 (A-8)

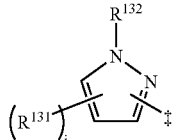 (A-9)

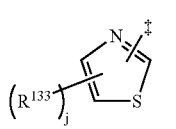 (A-10)

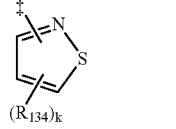 (A-11)

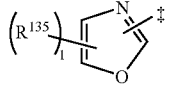 (A-12)

-continued

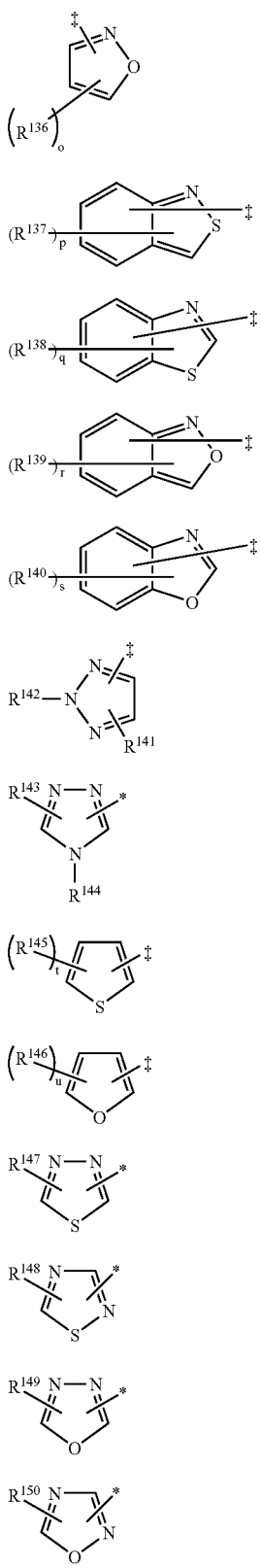

In compounds (A-1) to (A-25), $R^{121}$ to $R^{150}$ independently represent a hydrogen atom or a substituent. Examples of the substituent are the same as those explained for $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$.

b and c are an integer of from 0 to 6.

a, p, q, r and s are an integer of from 0 to 4.

d, e, f, g, t and u are an integer of from 0 to 3.

h, i, j, k, l and o are an integer of from 0 to 2.

When a to u are 2 or more, two or more substituents represented by $R^{121}$ to $R^{150}$ in one compound may be the same or different.

B is preferably represented by any of the following structures (a)-1, (a)-2 and (b) to (l).

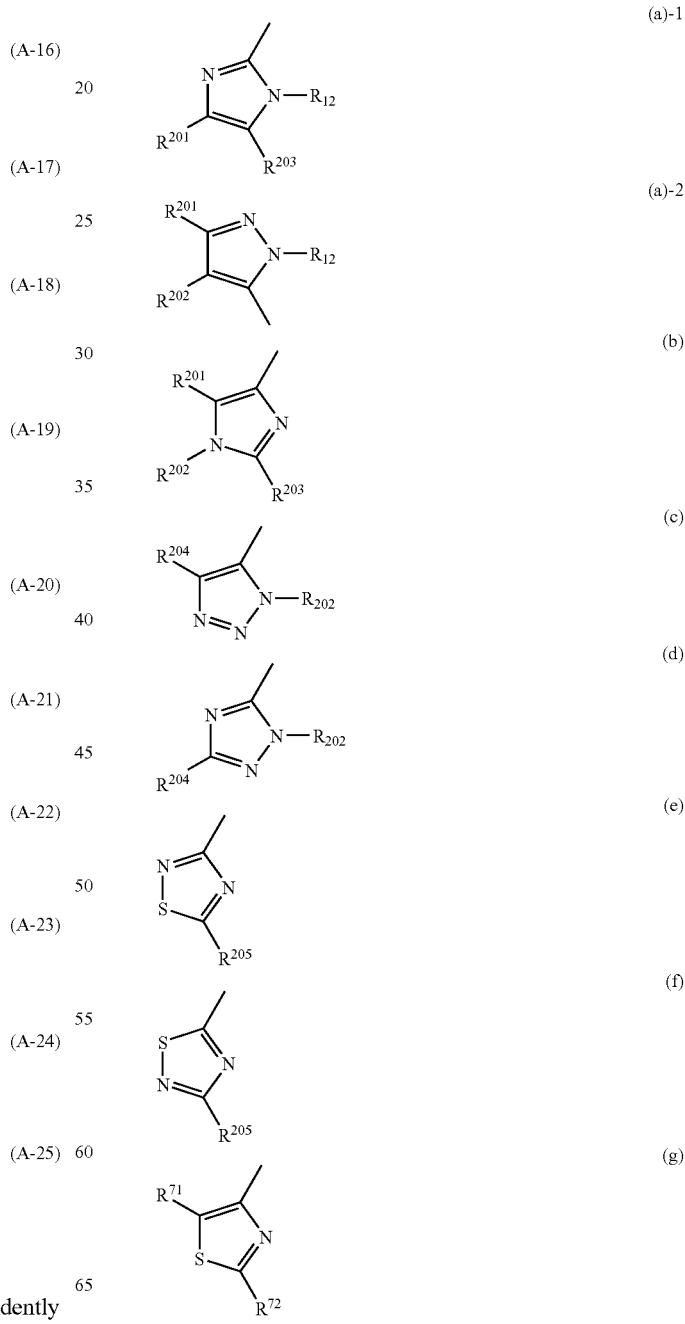

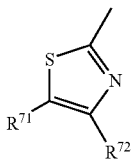
(h)

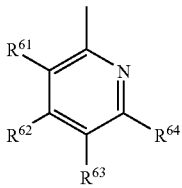
(i)

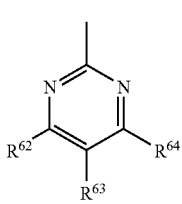
(j)

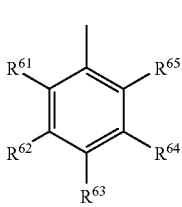
(k)

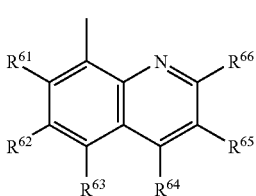
(l)

In the above structures (a)-1, (a)-2 and (b) to (l), $R^{61}$, $R^{62}$, $R^{63}$, $R^{64}$, $R^{65}$, $R^{66}$, $R^{71}$, $R^{72}$, $R^{201}$, $R^{202}$, $R^{203}$, $R^{204}$ and $R^{205}$ independently represent a hydrogen atom or a substituent. Examples of the substituent are the same as those explained for $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$.

When the structure represented by Dye is an azo dye, Dye is preferably a structure represented by the following formula (α).

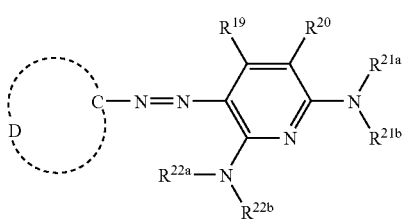

Formula (α)

In formula (α), D represents an atomic group necessary to form a hydrocarbon aromatic ring or a hetero ring in combination with the carbon atom to be combined (atomic group which is combined with the carbon atom bonding to —N═N— group to form a hydrocarbon aromatic ring or a hetero ring). $R^{19}$ is preferably a substituted or unsubstituted alkyl group, or a substituted or unsubstituted aryl group. $R^{20}$ is preferably a cyano group, a hydrogen atom, a substituted or unsubstituted alkoxycarbonyl group, or a substituted or unsubstituted carbamoyl group. $R^{21a}$, $R^{21b}$, $R^{22a}$ and $R^{22b}$ independently represent a hydrogen atom, a substituted or unsubstituted alkyl group, a substituted or unsubstituted aryl group, or a substituted or unsubstituted heterocyclic group.

The hetero ring formed by D is preferably a substituted or unsubstituted five membered or six-membered hetero ring having 1 to 20 carbon atoms and at least one nitrogen atom. $R^{19}$ is preferably a substituted or unsubstituted alkyl group, and $R^{20}$ is preferably a cyano group, a hydrogen atom, a substituted or unsubstituted alkoxycarbonyl group, or a substituted or unsubstituted carbamoyl group. $R^{21a}$, $R^{22b}$, $R^{22a}$ and $R^{22b}$ independently represent a hydrogen atom, a substituted or unsubstituted alkyl group, a substituted or unsubstituted aryl group, or a substituted or unsubstituted heterocyclic group.

Another preferable example of the structure represented by Dye is the structure represented by the following formula (β).

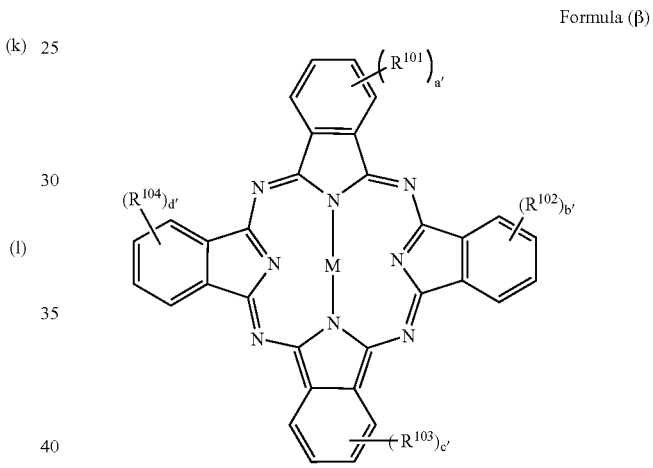

Formula (β)

In formula (β), $R^{101}$, $R^{102}$, $R^{103}$ and $R^{104}$ independently represent a substituent. a', b', c' and d' independently denote an integer of from 0 to 4. When a', b', c' and d' are independently 2 or more, $R^{101}$s, $R^{102}$s, $R^{103}$s and $R^{104}$s may be the same or different.

Examples of the substituent represented by $R^{101}$, $R^{102}$, $R^{103}$ and $R^{104}$ include the same groups as those explained as $R^{11}$ to $R^{28}$. Among those substituents, a substituted or unsubstituted alkoxy group, a substituted or unsubstituted alkyl group, a substituted or unsubstituted aryl group, a substituted or unsubstituted sulfamoyl group, a substituted or unsubstituted alkylsulfonyl group, and a substituted or unsubstituted arylsulfonyl group are preferable.

Next, L will be explained in detail.

L represents a divalent connecting group or a single bond. When n is 2 or more, multiple Ls may be the same or different.

Examples of L include a single bond, the following divalent groups (alkylene, arylene, —CO—, —N($R^{105}$)—, —O—, —S—, —SO—, —SO$_2$— and divalent groups derived from hetero rings) and groups formed by bonding a plurality of the above divalent groups (—CO—O—, —CON($R^{105}$))—, —O—CO—O—, —N($R^{105}$)—CO—O—, —N($R^{105}$)$_3$—CO—N($R^{105}$)—, —SO$_2$—O— and —SO$_2$—N($R^{105}$)—). $R^{105}$ represents a substituted or unsubstituted alkyl group, or a substituted or unsubstituted aryl group.

Among these groups, a single bond, —O—, —CO—O—, —CO—N($R^{105}$)—, —SO$_2$—O— and —SO$_2$—N($R^{105}$)— are preferable and —CO—O—, —CO—N($R^{105}$)—, —SO$_2$—O— and —SO$_2$—N($R^{105}$)— are more preferable.

The structure represented by UV in formula (I) will be explained in detail.

UV is a dye residue having absorption of 10000 (cm$^{-1}$·mol$^{-1}$) or more as a molar extinction coefficient for light having a wavelength of 280 nm to 450 nm. UV has a maximum absorption wavelength of preferably 280 nm to 450 nm and more preferably 350 nm to 380 nm. A maximum absorption wavelength of less than 280 nm results in a low refractive index of the dye at a recording wavelength when blue laser light is used to record information. This results in deteriorated recording ability. A maximum absorption wavelength of more than 450 nm leads to a low reflectance of the dye at a recording wavelength when blue laser light is used to record. This results in deteriorated recording ability.

The molar extinction coefficient of UV is preferably 10000 (cm$^-$1·mol$^{-1}$) to 200000 (cm$^{-1}$·mol$^{-1}$), more preferably 20000 (cm$^{-1}$·mol$^{-1}$) to 150000 (cm$^{-1}$·mol$^{-1}$) and most preferably 40000 (cm$^{-1}$·mol$^{-1}$) to 150000 (cm$^{-1}$·mol$^{-1}$).

UV in formula (I) is preferably a dye residue selected from a methine dye, a benzotriazole dye, a benzophenone dye and a triazine dye.

The structure represented by UV is preferably that represented by the following formula (A).

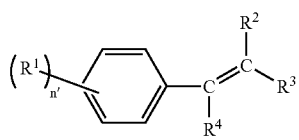

In formula (A), $R^1$ represents a substituent. $R^2$ and $R^3$ independently represent a cyano group, a substituted or unsubstituted alkoxycarbonyl group, a substituted or unsubstituted carbamoyl group, or a substituted or unsubstituted acyl group. $R^2$, $R^3$ and the carbon atom bonding to $R^2$ and $R^3$ may bond to each other to form a five-membered or six-membered ring. $R^4$ represents a substituted or unsubstituted aryl group, a cyano group, a substituted or unsubstituted alkoxycarbonyl group, a substituted or unsubstituted carbamoyl group, or a substituted or unsubstituted acyl group. n' denotes an integer of from 0 to 5. When n' is 2 or more, multiple $R^1$s may be the same or different.

Specific examples of the substituent represented by $R^1$ include those explained for the substituent represented by $R^{11}$ in formula (IV).

$R^1$ is preferably an alkoxy group which is disposed at the para position with respect to the vinyl group.

Other preferable structures of the dye residue represented by UV are those represented by the following formula (B).

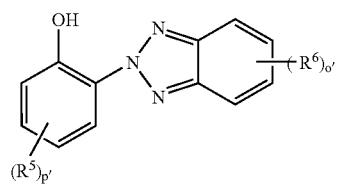

In formula (B), $R^5$ and $R^6$ are respectively a hydrogen atom or a substituent. p' and o' are respectively an integer from 0 to 4. $R^5$ is preferably a substituted or unsubstituted alkyl group, or a substituted or unsubstituted aryl group. $R^6$ is a substituted or unsubstituted alkoxycarbonyl group, a halogen atom, a substituted or unsubstituted alkoxy group, or a substituted or unsubstituted alkylthio group.

Other preferable structures of the dye residue represented by UV are those represented by the following formula (C).

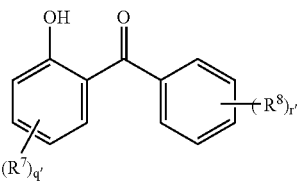

In formula (C), $R^7$ and $R^8$ are respectively a hydrogen atom or a substituent. r' and q' are respectively an integer from 0 to 4. $R^7$ is preferably a substituted or unsubstituted alkyl group, or a substituted or unsubstituted aryl group. $R^8$ is a substituted or unsubstituted alkoxycarbonyl group, a halogen atom, a substituted or unsubstituted alkoxy group, or a substituted or unsubstituted alkylthio group.

Other preferable structures of the dye residue represented by UV are those represented by the following formula (D).

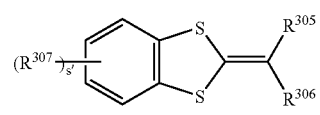

In formula (D), $R^{305}$ and $R^{306}$ respectively represent a cyano group, a substituted or unsubstituted alkoxycarbonyl group, a substituted or unsubstituted carbamoyl group, or a substituted or unsubstituted acyl group.

$R^{307}$ represents a substituent. s' denotes an integer from 0 to 4.

Other preferable structures of the dye residue represented by UV are those represented by the following formula (E).

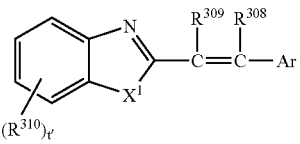

In formula (E), $R^{308}$, $R^{309}$ and $R^{310}$ respectively represent a hydrogen atom, a cyano group, a substituted or unsubstituted alkoxycarbonyl group, a substituted or unsubstituted carbamoyl group, or a substituted or unsubstituted acyl group.

Ar represents a substituted or unsubstituted heterocyclic group, or a substituted or unsubstituted aryl group. t' denotes an integer from 0 to 4. $X^1$ represents an oxygen atom, a sulfur atom or —N($R^{321}$)—. $R^{321}$ represents a substituted or unsubstituted alkyl group, or a substituted or unsubstituted aryl group.

Other preferable structures of the dye residue represented by UV are those represented by the following formula (F).

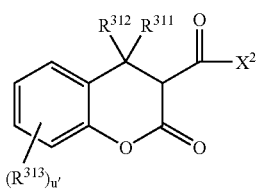

Formula (F)

In formula (F), $R^{311}$ and $R^{312}$ respectively represent a hydrogen atom or a substituent. $X^2$ represents a substituted or unsubstituted alkoxy group, a substituted or unsubstituted aryloxy group, or a substituted or unsubstituted amino group (including an anilino group). $R^{313}$ is a hydrogen atom or a substituent. u' is an integer from 0 to 4.

$R^{311}$ and $R^{312}$ are respectively preferably a substituted or unsubstituted alkyl group, a substituted or unsubstituted aryl group, a halogen atom, or a substituted or unsubstituted alkoxy group. $R^{131}$ is preferably a halogen atom, a substituted or unsubstituted alkoxy group, or a substituted or unsubstituted alkoxycarbonyl group.

Other preferable structures of the dye residue represented by UV are those represented by the following formula (G).

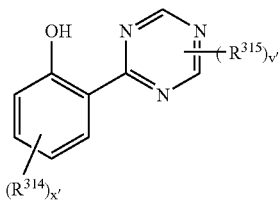

Formula (G)

In formula (G), $R^{314}$ and $R^{315}$ are respectively a substituent. v' is an integer from 0 to 4 and x' is an integer from 0 to 2.

$R^{314}$ is preferably a substituted or unsubstituted alkyl group, or a substituted or unsubstituted aryl group, and $R^6$ is preferably a substituted or unsubstituted amino group, a substituted or unsubstituted alkyl group, a substituted or unsubstituted aryl group, a substituted or unsubstituted alkoxy group, or a substituted or unsubstituted alkylthio group. v' is preferably 2. x' is preferably 2.

A method of combining the dye residue represented by A, the divalent group or single bond represented by L, and the dye residue represented by B will be explained hereinafter.

In the above explanations, the structures of the dye residues A and B were explained as complete compounds having no uncombined bond. When these dye residues are combined with L, they are converted into a monovalent group by eliminating one substituent or hydrogen atom from each dye structure to combine it with L.

When a recording layer containing the dye represented by formula (I) is formed, it is preferable that the recording layer has a refractive index (n) of higher than 1.50 and lower than 2.50 and an extinction coefficient (k) of higher than 0.03 and lower than 0.30 at the frequency of recording light.

The refractive index and the extinction coefficient can be easily measured by a rotary photon method (ellipsometer). Examples of the measuring device include Model V-VASE-S manufactured by J. A. WOOLLAM Co., Ltd.

The dye to be used in the recording layer preferably has high solubility in an organic solvent. For example, the mass solubility of the dye in tetrafluoropropanol (fluorinated alcohol TFP (trade name) manufactured by Daikin Industries, Ltd.) is preferably 0.1% to 50%, more preferably 0.5% to 20% and most preferably 1% to 10%.

The melting point of the dye of formula (I) is preferably 100° C. to 500° C., more preferably 150° C. to 400° C. and particularly preferably 200° C. to 300° C.

The rate of reduction in the weight of the dye of formula (I) at a thermal decomposition point is 10% to 90% and more preferably 20% to 70%.

Specific examples (dyes 1 to 47) of the dye represented by formula (I) are shown below, however, this invention is not limited to those examples.

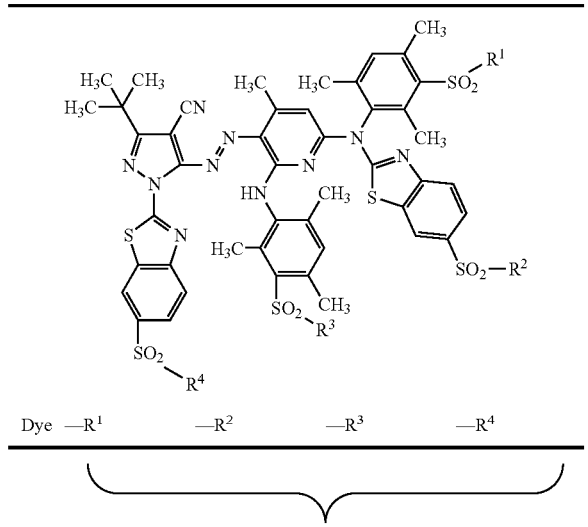

1. 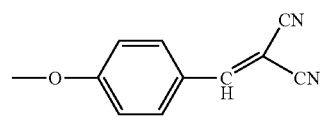

2. 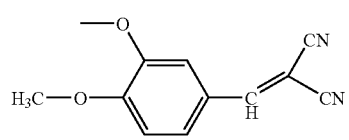

3. 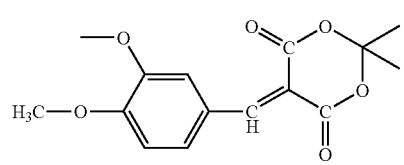

4. 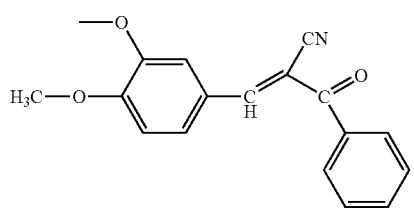

5. 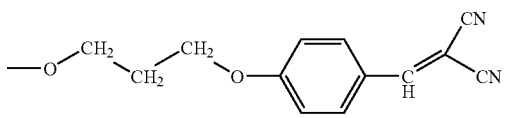

-continued
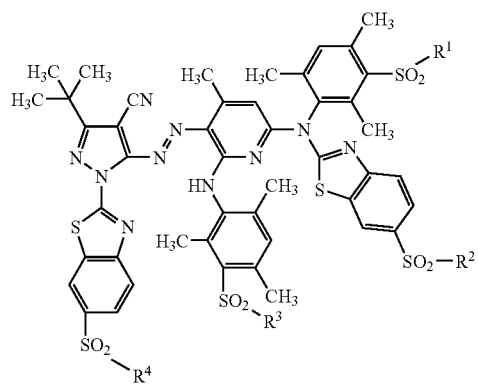
| Dye | —R¹ | —R² | —R³ | —R⁴ |
|---|---|---|---|---|
6. 7. 8. 9.
-continued
10.
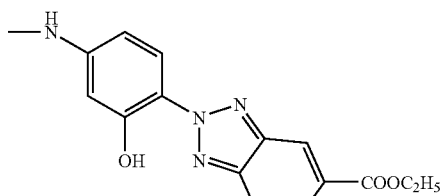
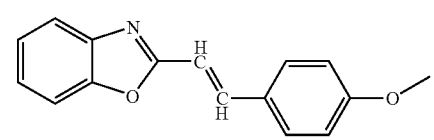
| Dye | —R¹ | —R² | —R³ | —R⁴ |
|---|---|---|---|---|
11. 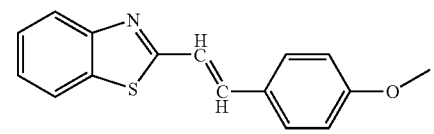
12. 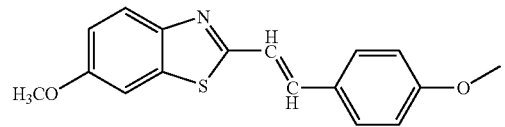
13. 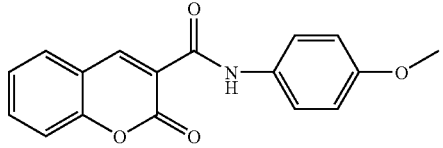
14. 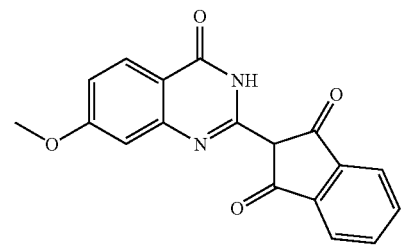

15. 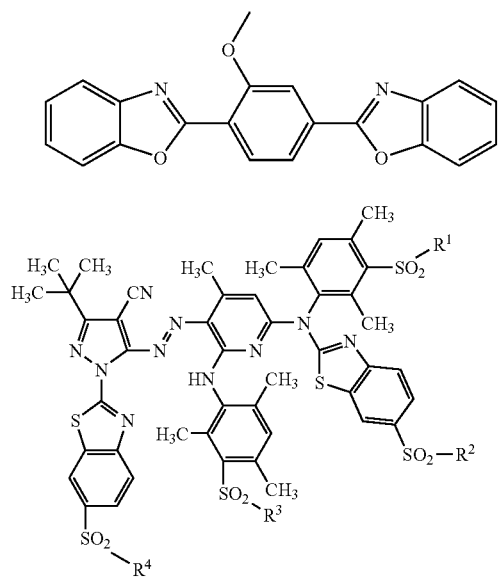
Dye —R¹ —R² —R³ —R⁴
16. 
17. 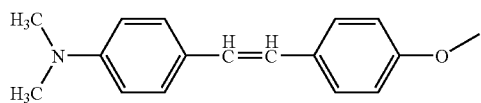
18. 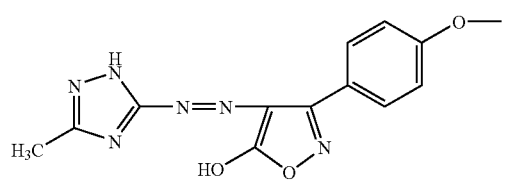
19. 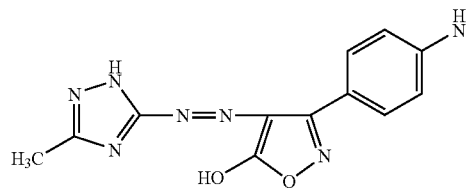
20. 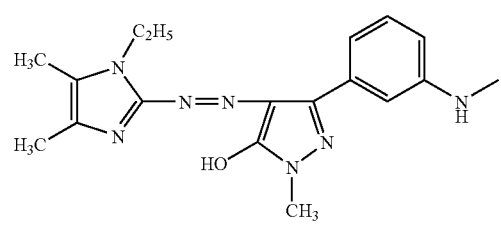
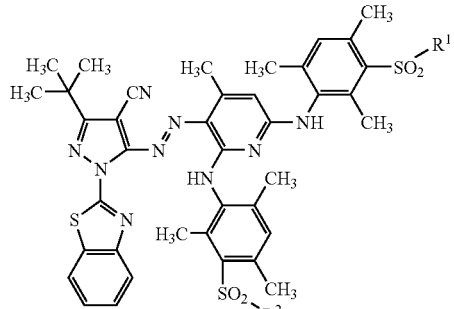
Dye —R¹ —R²
21. 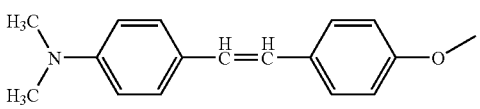
22. 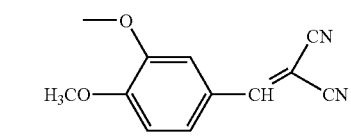
23. 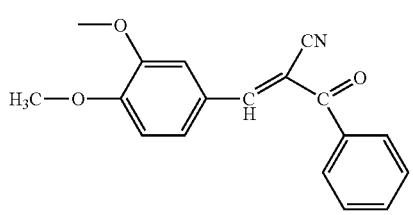
24. 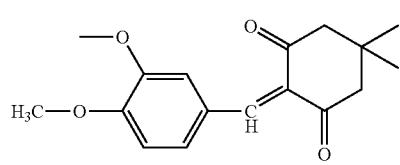
25. 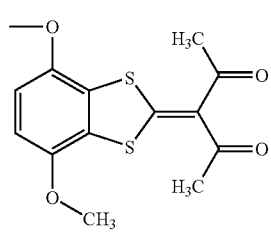

-continued

[Structure: imidazole-dicyano group connected via N=N azo to a phenyl ring bearing NHSO₂CF₃ and N(C₆H₄SO₂R¹)(C₆H₄SO₂R²)]

| Dye | —R¹ | —R² |
|---|---|---|
| 26. | [(C₂H₅)₂N-C₆H₄-CH=CH-C₆H₄-OCH₃] | |
| 27. | [3,4-diethoxy/methoxy-C₆H₃-CH=C(CN)₂] | |
| 28. | [(CH₃)₂N-CH=CH-CH=C(SO₂-C₆H₄-OCH₃)(CO₂C₂H₅)] | |
| 29. | [benzotriazole-NHCH₃ substituted, with 2-(2'-hydroxy-3'-methyl-5'-tert-butylphenyl)benzotriazole] | |
| 30. | [4,7-dimethoxy-benzo-1,3-dithiol-2-ylidene with C(COCH₃)(COC₆H₅)] | |

-continued

[Structure: phthalocyanine macrocycle with substituents SO₂R¹, SO₂R², SO₂R³, SO₂R⁴ and central metal M]

| Dye | —R¹ | —R² | —R³ | —R⁴ | M |
|---|---|---|---|---|---|
| 31. | [4-methoxy-C₆H₄-CH=C(CN)₂] | | | | Cu |
| 32. | [3,4-dimethoxy-C₆H₃-CH=C(CN)₂] | | | | Cu |
| 33. | [2-(2-hydroxy-5-methylamino-phenyl)benzotriazole] | | | | Cu |
| 34. | [benzothiazol-2-yl-CH=CH-C₆H₄-OCH₃] | | | | Zn |
| 35. | [4,7-dimethoxy-benzo-1,3-dithiol-2-ylidene-C(COCH₃)₂] | | | | Cu |

-continued
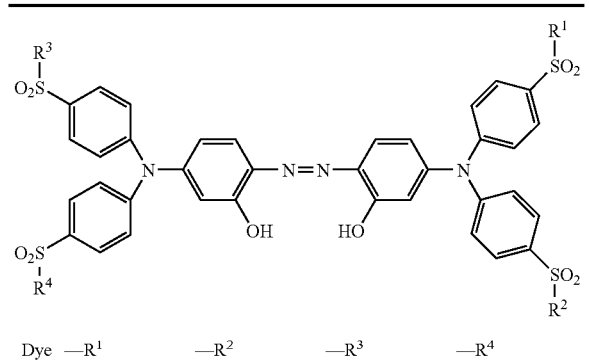
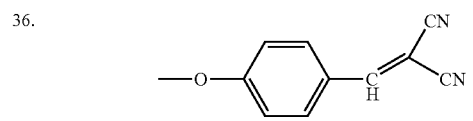
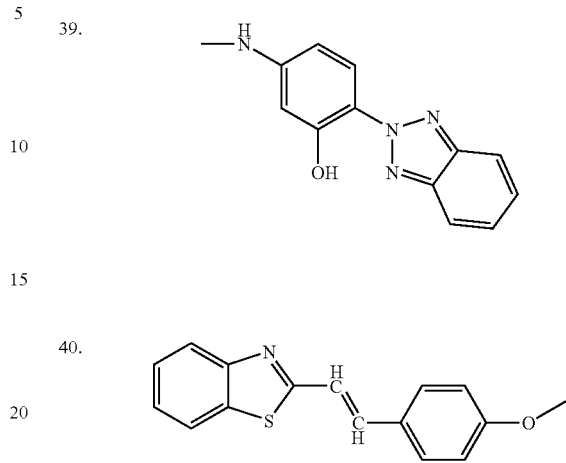
41. Ni chelating dye of Dye 26
42. Cu chelating dye of Dye 27
43. Cr chelating dye of Dye 29
44. Ni chelating dye of Dye 36
45. Ni chelating dye of Dye 37
46. Zn chelating dye of Dye 39
47. Ni chelating dye of Dye 40
A method of synthesizing the dye of formula (I) will be mentioned.
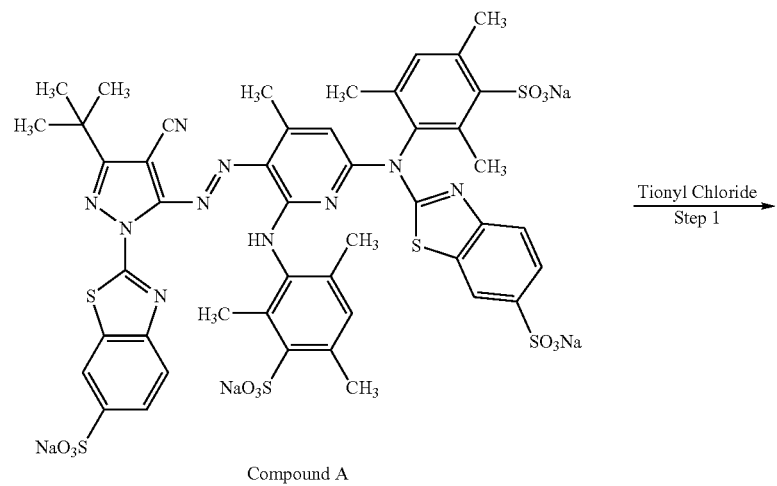

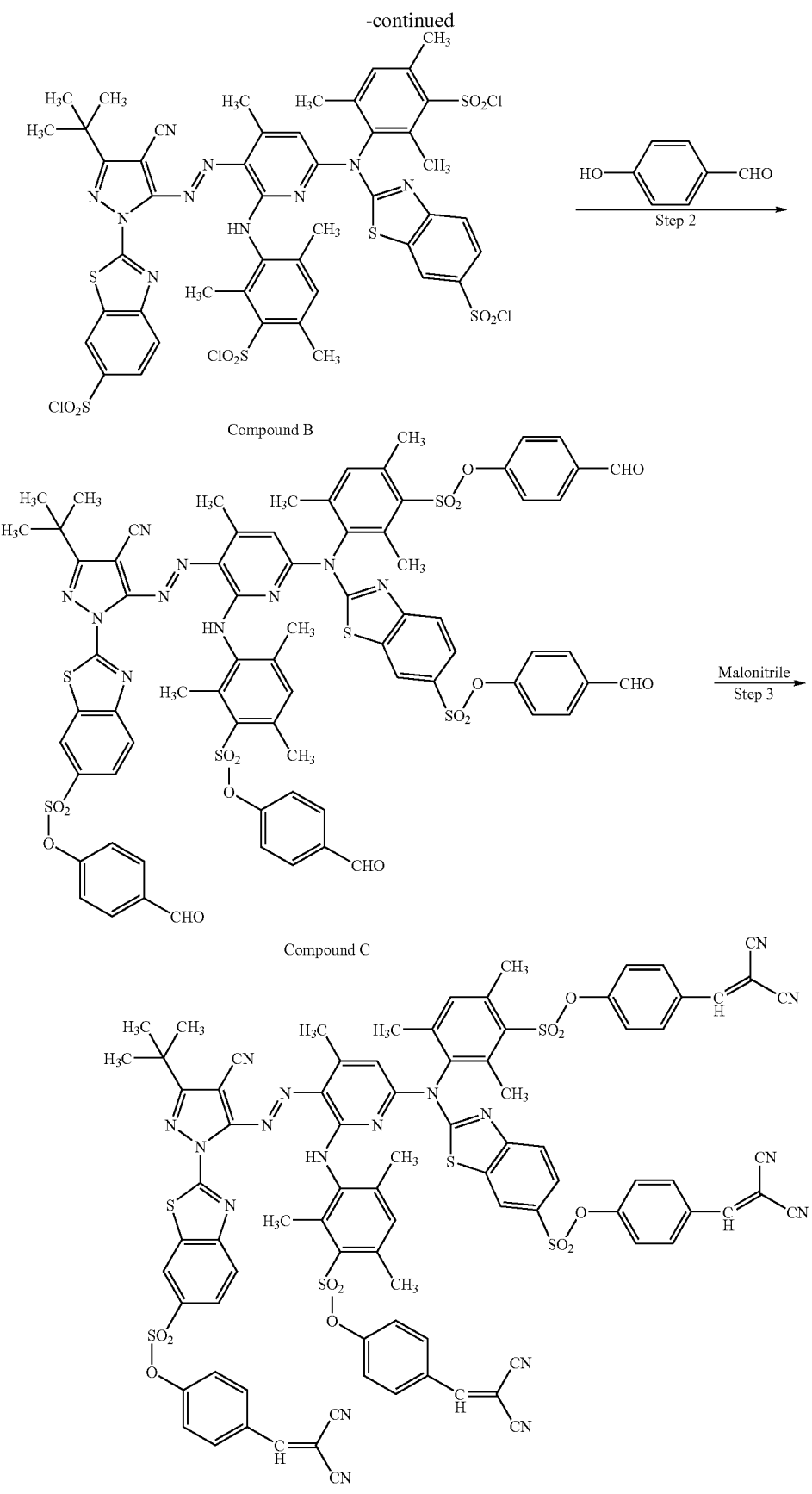

Synthesis of Dye 1

Dye 1 was synthesized according to pamphlets of International Patent Application Laid-Open Nos. 02/83795 and 02/83662.

Step 1

5 ml of dimethylformamide was added to a suspension solution containing 20 g (16.4 mmol) of compound A and 117 g (985 mmol) of thionyl chloride, which suspension solution was being stirred, and compound A and thionyl chloride were reacted at 20° C. for 2 hours and then at 50° C. for 2 hours. After the reaction solution was cooled to 20° C., it was slowly poured into 1000 ml of ice water. Precipitated crystals were collected and thoroughly washed with 60 ml of acetonitrile. The crystals were air-dried at 20° C. for a day and 17.8 g of compound B was obtained (yield: 91%).

Step 2

2.0 g (1.68 mmol) of compound B was slowly added to a mixture of 1.02 g (8.39 mmol) of p-hydroxybenzaldehyde, 0.85 g (8.39 mmol) of triethylamine and 20 ml of dimethylacetamide, which mixture was being stirred at 0° C. After compound B and p-hydroxybenzaldehyde were reacted at 0° C. for 2 hours, the reaction solution was poured into 100 ml of diluted hydrochloric acid and a product was extracted with ethyl acetate. The resultant organic phase was washed twice with water and once with saturated brine, and dried with magnesium sulfate. Then, the solvent in the organic phase was distilled under a reduced pressure by using an evaporator. The residue was purified using silica gel column chromatography and 2.61 g of compound C was obtained (yield: quantitative).

Step 3

2.61 g (1.68 mmol) of compound C, 0.554 g (8.4 mmol) of malonitrile, 100 ml of ethanol, 100 ml of n-butanol, 50 ml of toluene and 0.1 g of glycine were stirred at 80° C. for 2 hours. After the reaction solution was concentrated, water and ethyl acetate were added to the reaction solution to separate the solution into a water phase and an organic phase. The organic phase was washed twice with water and once with saturated brine, and dried with magnesium sulfate, followed by distilling solvents in the organic phase under a reduced pressure. The residue was purified using silica gel column chromatography and 1.50 g of dye 1 was obtained (yield: 51.6%).

The structure of dye 1 was confirmed with mass spectra and $^1$HNMR spectra.

In the optical information recording medium of the invention, the aforementioned azo chelating dye may be used together with a conventionally known optical disk dye. Examples of the dye include azo chelating dyes, oxonol dyes, cyanine dyes and phthalocyanine dyes.

The optical information recording medium of the invention has, on a substrate, a recording layer containing an azo chelating dye which has a specific structure described above. The optical information recording medium of the invention includes those having various structures. The optical information recording medium preferably has a structure in which a recording layer, a light-reflecting layer and a protective layer are disposed in this order on a disk substrate on which pre-grooves are formed at a fixed track pitch, or a structure in which a light-reflecting layer, a recording layer and a protective layer are disposed in this order on the substrate. Also, a structure is also preferable in which two stratified products each having a recording layer and a light-reflecting layer on a transparent disk substrate on which pre-grooves are formed at a fixed track pitch are joined with each other such that each recording layer faces inside.

The optical information recording medium of the invention can be applied to DVD-Rs if the absorption waveform of the Dye part of the dye is optimally controlled. In this case, two stratified products each of which has a transparent disk substrate having a thickness of 0.6±0.1 mm and pre-grooves which has a track pitch of 0.6 to 0.9 μm and, on the pre-groove side of the substrate, a recording layer, are joined with each other such that each recording layer faces inside. The depth of the pre-grooves is in the range of from 0.05 to 100 μm and preferably in the range of from 0.1 to 50 μm.

When the optical information recording medium of the invention is applied to optical disks using laser light having a wavelength of 450 nm or less for writing, the track pitch is preferably in the range of 0.2 to 0.8 μm, more preferably in the range of 0.25 to 0.6 μm and still more preferably in the range of 0.27 to 0.4 μm.

The depth of the pre-grooves is in the range of preferably 0.03 to 0.18 μm, more preferably in the range of 0.05 to 0.15 μm and particularly preferably in the range of 0.06 to 0.1 μm.

A method of producing the optical information recording medium of the invention will be explained by way of an optical information recording medium having a structure in which a recording layer, a light-reflecting layer and a protective layer are formed in this order on a disk substrate.

The substrate of the optical information recording medium of the invention may be made of any material used for the substrates of conventional optical information recording media. Examples of the substrate material include glass, polycarbonates, acrylic resins such as polymethyl methacrylate, vinyl chloride resins such as polyvinyl chloride and a vinyl chloride copolymer, epoxy resins, amorphous polyolefins, and polyesters. These materials may be combined, if necessary. These materials may be used in the form of a film or in the form of a rigid substrate. Among the above materials, polycarbonates are preferable in view of moisture resistance, dimensional stability, and cost.

An undercoat layer may be formed on the surface of the substrate on which surface a recording layer is disposed in order to improve flatness and adhesive strength and prevent deterioration of a recording layer. Examples of the material used for the undercoat layer include polymeric materials such as polymethyl methacrylate, an acrylic acid/methacrylic acid copolymer, a styrene/maleic anhydride copolymer, polyvinyl alcohol, N-methylolacrylamide, a styrene/vinyltoluene copolymer, chlorosulfonated polyethylene, nitrocellulose, polyvinyl chloride, chlorinated polyolefin, polyester, polyimide, a vinyl acetate/vinyl chloride copolymer, an ethylene/vinyl acetate copolymer, polyethylene, polypropylene and polycarbonate; and surface modifiers such as a silane coupling agent. The undercoat layer may be formed in the following manner: the above material is dissolved or dispersed in a proper solvent to prepare a coating solution, and the coating solution is then applied to the surface of a substrate by a coating method such as spin coating, dip coating or extrusion coating. The thickness of the undercoat layer is generally in the range of 0.005 to 20 μm and preferably in the range of 0.01 to 10 μm.

The recording layer is formed in the following manner: the above dye and optionally, a quencher and a binder are dissolved in a solvent to prepare a coating solution, and the coating solution is then applied to the surface of a substrate to form a coating layer, and the coating layer is then dried. Examples of the solvent in the coating solution include organic solvents including esters such as butyl acetate, ethyl lactate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as methylcyclohexane; ethers such as dibutyl ether, diethyl ether, tetrahydrofuran and dioxane; alcohols such as ethanol, n-propanol, isopropanol, n-butanol and diacetone alcohol; fluorinated solvents such as 2,2,3,3-tetrafluoropropanol; and glycol ethers such as ethylene glycol monomethyl ether, ethylene glycol monoethyl ether and propylene glycol monomethyl ether. The above solvents may be used either alone or as a mixture in consideration of the solubility of the dye. Various additives such as an antioxidant, a UV absorbent, a plasticizer and a lubricant may be added to the coating solution according to the purpose.

When a binder is used, examples of the binder include natural organic polymeric materials such as gelatin, cellulose derivatives, dextran, rosin and rubbers; and synthetic organic polymers such as hydrocarbon resins such as polyethylene, polypropylene, polystyrene and polyisobutylene, vinyl resins such as polyvinyl chloride, polyvinylidene chloride and a polyvinyl chloride/polyvinyl acetate copolymer, acrylic resins such as polymethyl acrylate and polymethyl methacrylate, polyvinyl alcohol, chlorinated polyethylene, epoxy resins, butyral resins, rubber derivatives and initial condensates of thermosetting resins such as a phenol/formaldehyde resin. When the binder is used as one of materials of the recording layer, the amount of the binder to be used is generally 0.01 to 50 times and preferably 0.1 to 5 times as much as the mass of the dye. The concentration of the dye in the coating solution prepared in this manner is generally 0.01 to 10% by mass and preferably 0.1 to 5% by mass.

Examples of the coating method include a spray method, a spin coating method, a dipping method, a roll coating method, a blade coating method, a doctor roll method and a screen printing method. Among these methods, it is preferable to use a spin coating method. The recording layer may be either a single layer or multi layers. The thickness of the recording layer is generally in the range of from 20 to 500 nm, preferably in the range of 30 to 300 nm and more preferably in the range of 50 to 100 nm.

The recording layer may contain any anti-fading agent to improve light resistance of the recording layer. As the anti-fading agent, a singlet oxygen quencher is usually used. As the singlet oxygen quencher, those already described iii known publications such as patent specifications may be utilized. Specific examples of the singlet oxygen quencher include those described in each JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995 and 4-25492, Japanese Patent Application Publication (JP-B) Nos. 1-38680 and 6-26028, German Patent No. 350399 and Journal of Japan Chemical Society, October issue, 1992, page 1141.

The amount of the anti-fading agent such as the singlet oxygen quencher is generally in the range of from 0.1 to 50% by mass, preferably in the range of 0.5 to 45% by mass, more preferably in the range of 3 to 40% by mass and particularly preferably in the range of 5 to 25% by mass based on the amount of the dye.

It is preferable to dispose a light-reflecting layer adjacent to the recording layer for the purpose of improving reflectance when reproducing information. A light reflecting material which is the material of the light reflecting layer has high reflectance to laser light. Examples of the light-reflecting material include metals or semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, and stainless steel. These materials may be used alone or as mixtures or as alloys. Among these materials, Cr, Ni, Pt, Cu, Ag, Au, Al and stainless steel are preferable. Au metal, Ag metal, Al metal or alloys of these metals are particularly preferable and Ag metal, Al metal and alloys thereof are the most preferable. The light reflecting layer may be formed on the substrate or the recording layer by vapor-depositing, sputtering or ion-plating the light-reflecting material. The thickness of the light reflecting layer is generally in the range of from 10 to 300 nm and preferably in the range of 50 to 200 nm.

A protective layer is preferably formed on the light reflecting layer or recording layer for the purpose of physically and chemically protecting the recording layer and the like. When the same form as a DVD-R type optical information recording medium, namely, a structure in which two substrates on each of which a recording is disposed are bonded to each other such that each recording layer faces inside, is adopted, it is not always necessary to provide the protective layer. Examples of the material used in the protective layer include inorganic materials such as SiO, $SiO_2$, $MgF_2$, $SnO_2$ and $Si_3N_4$ and organic materials such as thermoplastic resins, thermosetting resins and UV-curable resins. The protective layer may be formed on the light-reflecting layer, for example, by laminating a film obtained by extrusion processing of a plastic on the light-reflecting layer with an adhesive. Alternatively, the protective layer may be formed by a method such as vacuum deposition, sputtering or application. Moreover, in the case of a thermoplastic resin or a thermosetting resin, the protective layer can be formed by dissolving the resin in a proper solvent to prepare a coating solution, applying the coating solution and drying the resultant coating. In the case of a UV-curable resin, the protective layer can be formed by applying the UV-curable resin as it does or a coating solution in which the UV-curable resin is dissolved in a proper solvent and irradiating the resultant coating with UV light to cure the coating. Various additives such as an antistatic agent, an antioxidant and a UV absorbent may be further added to the coating solution according to the object. The thickness of the protective layer is generally in the range of from 0.1 µm to 1 mm. A layered product in which the recording layer, the light-reflecting layer and the protective layer are formed on the substrate, or a layered product in which the light-reflecting layer, the recording layer and the protective layer are formed on the substrate is produced through the above steps.

A method of recording information in the optical information recording medium of the invention is performed, for example, in the following manner. First, recording light, for example, from a semiconductor laser is irradiated onto the optical information recording medium, which is being rotated at a constant linear velocity or constant angular velocity, from the substrate side or from the protective layer side thereof. It is thought that this light irradiation causes the recording layer to absorb the light, and that thereby the temperature of the recording layer locally raises, and that physical or chemical change of the recording layer (for example, generation of pits) is caused to change the optical characteristics of the recording layer and that, as a result, the information is recorded. When the optical information recording medium of the invention is applied to a DVD-R, a semiconductor laser having an oscillation wavelength ranging from 600 to 700 nm, preferably 620 to 680 nm and more preferably 630 to 670 nm is used as a light source for the recording light.

The optical information recording medium of the invention is preferably applied to an optical recording disk using a semiconductor laser which has an oscillation wavelength range of from 390 to 550 nm as the recording light. Preferable examples of a light source in this case include a bluish violet light-emitting semiconductor laser having an oscillation wavelength range of from 390 to 415 nm, a bluish green light-emitting semiconductor laser having a center oscillation wavelength of 515 nm and a bluish violet light-emitting SHG laser having a center oscillation wavelength of 425 nm obtained by halving the center oscillation wavelength (850 nm) of an infrared semiconductor laser by using an optical waveguide element. Among these lasers, it is particularly preferable to use a bluish violet light-emitting semiconductor or a SHG laser from the viewpoint of recording density. Among these lasers, a 400 to 440 nm blue light-emitting semiconductor laser is the most preferable.

The reproduction of the information recorded in the above manner may be carried out by irradiating light from a semiconductor laser onto the optical information recording medium, which is being rotated at the same constant linear velocity as above, from the substrate side or the protective layer side thereof and by detecting the reflected light.

EXAMPLES

The invention will be hereinafter explained in detail by way Of examples, however, this invention is not limited to those examples.

Absorption Spectra of Dye Film

Figure 2:
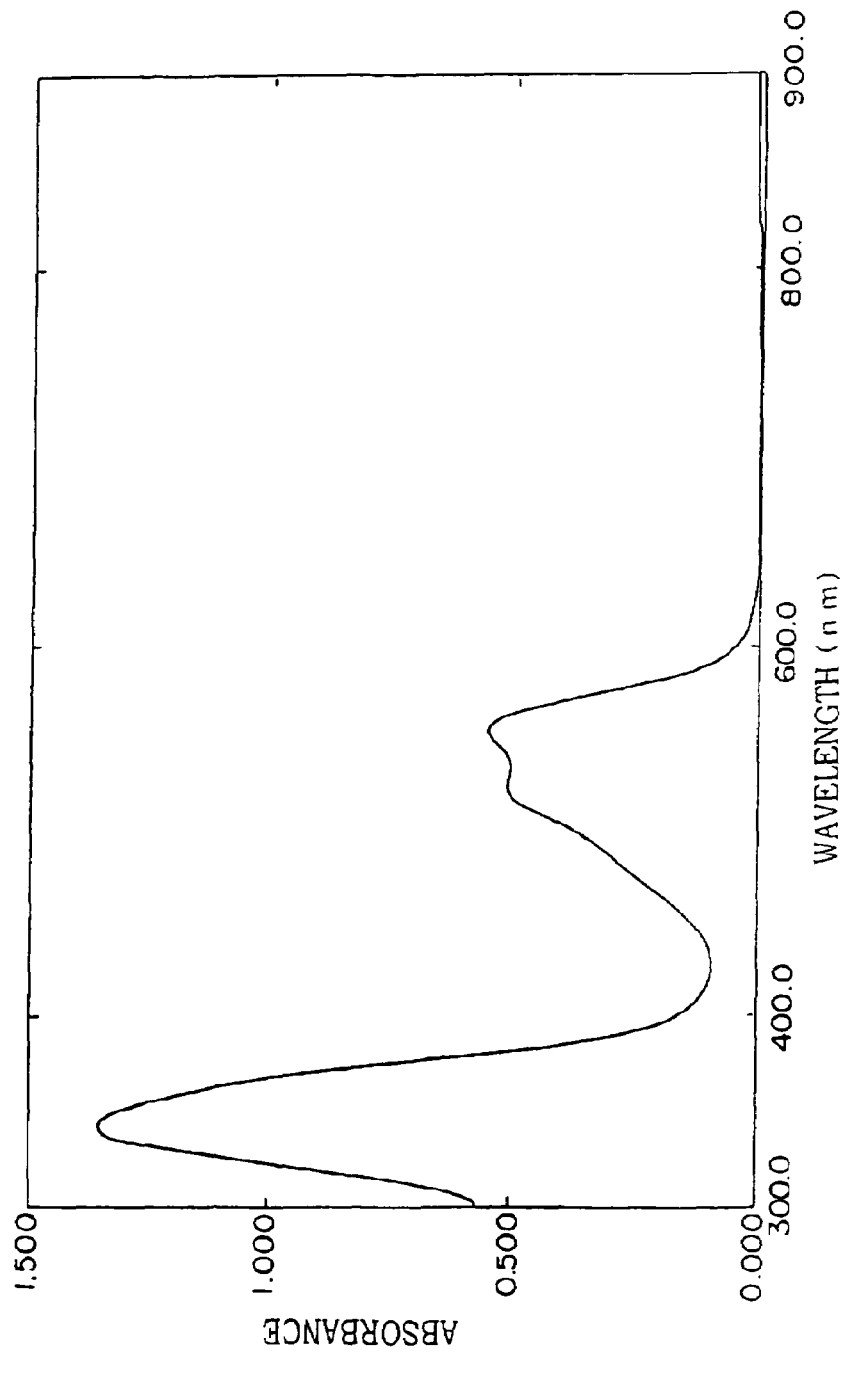
FIG. 2 is a graph showing absorption spectra of a film made of dye 2.
Figure 3:
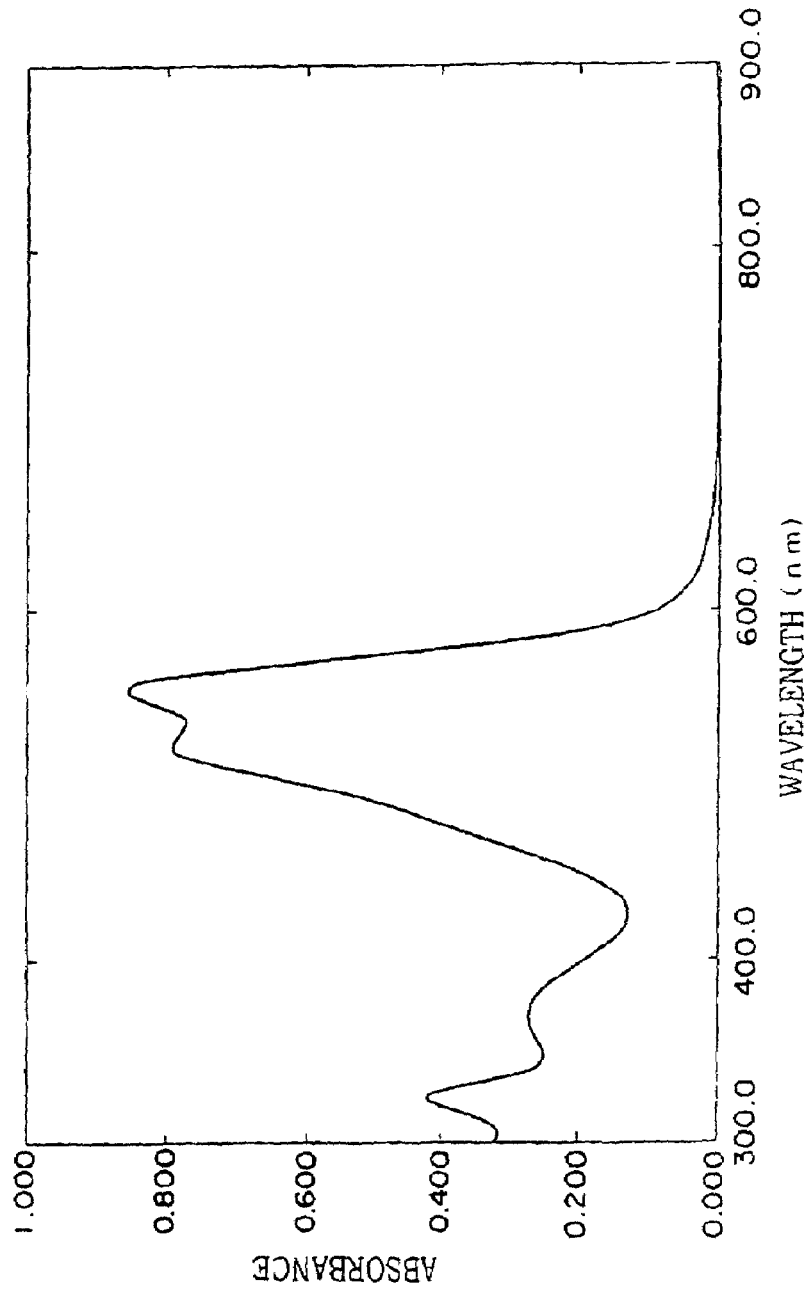
FIG. 3 is a graph showing absorption spectra of a film made of comparative dye A.

Each of dyes 1 and 2 described above and the following comparative dye A was dissolved in tetrafluoropropanol to prepare a coating solution, and the coating solution was then applied to a glass substrate by spin coating to form a dye amorphous film. The absorption spectra of each of the resultant films are shown in FIGS. 1 to 3. Furthermore, the maximum absorption wavelength and molar extinction coefficient of Dye and UV in dyes 1, 2 and the following comparative dye A are shown in Table 1.

It is found from FIGS. 1 to 3 that the dyes of formula (I) have large absorption in the wavelength range of from 280 to 450 nm and are therefore preferable as a dye for an optical information recording medium using blue laser light for information recording.

Comparative Dye A

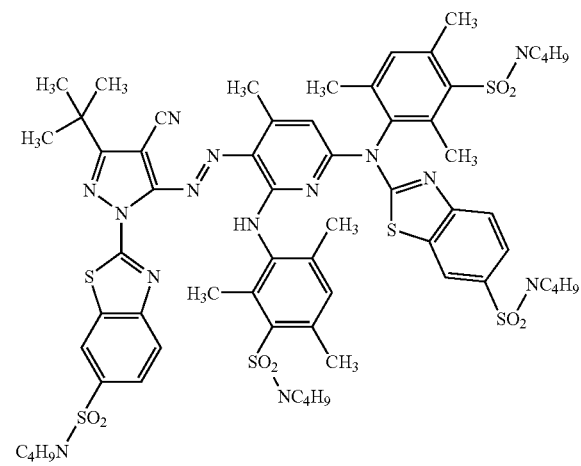

TABLE 1

| | Dye | | UV | |
|---|---|---|---|---|
| | Molar extinction coefficient ($cm^{-1} \cdot mol^{-1}$) | Maximum absorption wavelength (nm) | Molar extinction coefficient ($cm^{-1} \cdot mol^{-1}$) | Maximum absorption wavelength (nm) |
| Dye 1 | 44300 | 548 | 101000 | 317 |
| Dye 2 | 44300 | 549 | 113000 | 346 |
| Comparative dye A | 48000 | 552 | — | — |

Example 1

Evaluation of Optical Disk (Optical Information Recording Medium)

A substrate having a thickness of 1.1 mm was made from a polycarbonate resin (Panlight AD5503) manufactured by Teijin Chemicals Ltd. by injection molding. The track pitch of grooves on the substrate was 320 nm, the half width of the portions on the grooves was 110 nm and the depth of the grooves was 35 nm.

A reflecting layer having a thickness of 100 nm was formed on the substrate by using a target containing Ag (98.1 parts), Pd (0.9 parts) and Cu (1.0 part) by a vacuum filming method.

Next, dye 1 was weighed such that the amount of the dye was 2.5 g with respect to 100 ml of TFP and the weighed dye 1 was mixed with TFP. Ultrasonic wave was applied onto the resultant mixture for 2 hours to dissolve the dye in the solvent and then the resultant solution was allowed to stand under an environment of 23° C. and 50% humidity for at least 0.5 hours. Then, the solution was filtered with a filter having a pore size of 0.2 µm and a coating solution was thus obtained. Using this coating solution, a recording layer having a thickness of 110 nm was formed on the reflecting layer by a spin coating method.

Next, the resultant sample on which the recording layer was formed was heated in a clean oven at 80° C. for one hour.

A film having a thickness of 5 nm was formed on this heat-treated sample by using a target consisting of ZnS (8 parts) and $SiO_2$ (2 parts) by a vacuum filming method and then a polycarbonate film having a thickness of 80 µm was bonded to the sample via an adhesive layer having a thickness of 20 µm to obtain an optical information recording medium of Example 1.

The produced optical information recording medium was set to DDU-1000 (manufactured by Pulstech Industrial Co., Ltd.) including a laser optical system which could emit light having a wavelength of 403 nm and which had NA of 0.85. Random signals (2T to 8T) 1-7-modulated by 10 mW power were recorded on and reproduced from the optical information recording medium to evaluate jitter. At this time, the linear velocity was 5.28 m/s and the emission pattern of the laser during recording was optimized. The value of the jitter measured with a conventional equalizer was 10.7%.

Examples 2 to 11, and Comparative Examples 1 to 6

Optical information recording media of Examples 2 to 11 and Comparative Examples 1, 3, 5 and 6 were manufactured or attempts to manufacture optical information recording media of Comparative Examples 2 and 4 were conducted and evaluated in the same manner as in Example 1 except that dyes described in Table 2 were used in place of dye 1 of Example 1, respectively.

Comparative Dye B

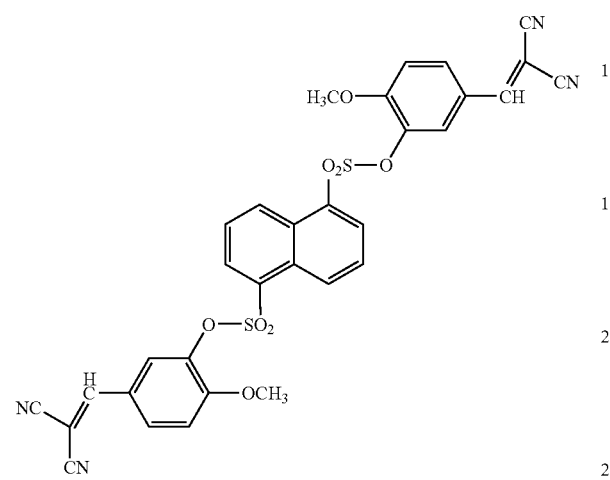

Comparative Dye C

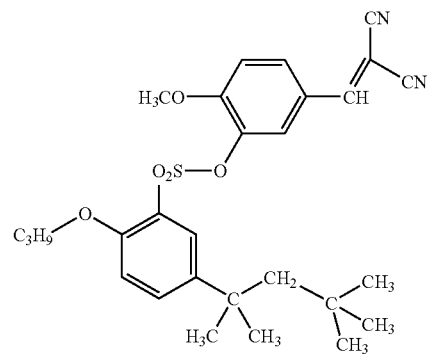

Comparative Dye D

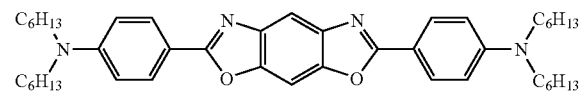

(Compound 1-1 Described in JP-A No. 2001-253171)

Comparative Dye E

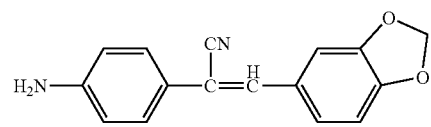

(Dye (12) Described in JP-A No. 2002-2117)

Comparative Dye F

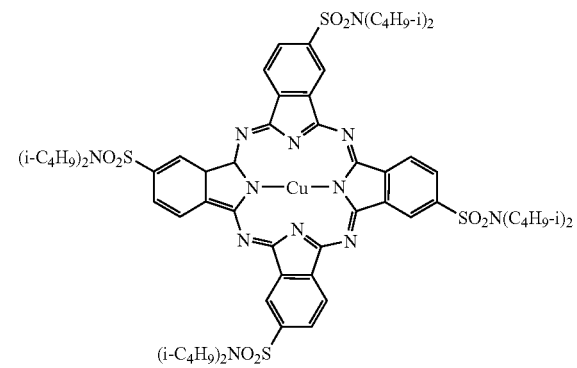

(Dye (1-1) Described in JP-A No. 2002-301870)

Evaluation of Light Fastness

A light-fading test was conducted for the manufactured optical information recording media by using a 100000 Lux Merry-go-round type light-fading tester. The optical information recording medium was irradiated with light for 3 days without using a UV filter. The residual rate was obtained from the transmission concentration of the dye before the test and that after the test. The results are shown in Table 2.

TABLE 2

| | Dye in recording layer | Jitter(%) | Light-fading (residual rate) |
|---|---|---|---|
| Example 1 | Dye 1 | 10.7 | 93 |
| Example 2 | Dye 2 | 8.1 | 92 |
| Example 3 | Dye 3 | 11.1 | 89 |
| Example 4 | Dye 12 | 12.1 | 90 |
| Example 5 | Dye 20 | 10.7 | 91 |
| Example 6 | Dye 21 | 10.9 | 92 |
| Example 7 | Dye 28 | 12.3 | 89 |
| Example 8 | Dye 32 | 11.5 | 93 |
| Example 9 | Dye 33 | 9.9 | 94 |
| Example 10 | Dye 38 | 10.2 | 97 |
| Example 11 | Dye 40 | 10.3 | 98 |
| Comparative Example 1 | Comparative dye A | *1 | 98 |
| Comparative Example 2 | Comparative dye B | Crystals precipitated and evaluation was impossible. | |
| Comparative Example 3 | Comparative dye C | *1 | 21 |
| Comparative Example 4 | Comparative dye D | Crystals precipitated and evaluation was impossible. | |
| Comparative Example 5 | Comparative dye E | *1 | 34 |
| Comparative Example 6 | Comparative dye F | *1 | 98 |

Note)
*1 Degree of modulation was low and measurement was impossible.

The dye represented by formula (I) has high solubility and can be used to manufacture an optical information recording medium. It is found from Table 2 that Examples 1 to 11 including the dye represented by formula (I) in a recording layer have reduced jitter in optical recording and have high light fastness. It is also found that the light fastness is improved by incorporating Dye into the molecule of the dye.

In Comparative Example 1 including comparative dye A which has no dye residue corresponding to the UV part of the dye represented by formula (I), the optical information recording medium could be manufactured by a spin coating method, however, the optical information recording medium had high jitter in the optical recording test.

On the other hand, Comparative Example 2 using comparative dye B which has no dye residue corresponding to Dye in the dye represented by formula (I) tends to be crystallized and optical information recording medium could not be made from comparative dye B.

In Comparative Example 3 using comparative dye C into which a substituent improving solubility is introduced, an optical information recording medium could be manufactured. However, because the molecular weight of the dye is increased, jitter is high in the optical recording test. The light fastness is very low.

What is claimed is:

1. An optical information recording medium comprising a substrate having provided thereon a recording layer in which information can be recorded by laser light irradiation, wherein the recording layer contains a dye represented by the following formula (I):

Dye—(L—UV)$_m$    Formula (I)

wherein Dye represents a dye residue having a molar extinction of 10000 (cm$^{-1}$·mol$^{-1}$) or more for light having a wavelength of 450 nm to 900 nm; L represents a divalent connecting group or a single bond; UV represents a dye residue having a molar extinction of 10000 (cm$^{-1}$·mol$^{-1}$) or more as a molar extinction coefficient for light having a wavelength of 280 nm to 450 nm; and m denotes an integer from 1 to 8, wherein in the dye represented by formula (I), Dye has a structure represented by the following formula (II) and UV represents a monovalent group derived from a structure represented by any one of the following formulae (A) to (G):

formula (II): A-N=N—B, wherein A and B respectively represent an aromatic ring or a hetero ring;

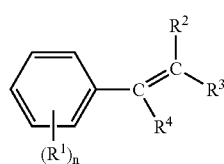

formula (A)

wherein in formula (A), $R^1$, $R^2$, $R^3$ and $R^4$ respectively represent a substituent; and n denotes an integer from 0 to 5, and when n is 2 or more, multiple $R^1$s may be the same or different;

wherein the bond on the left side of L is bound with A or B in formula (II) and the bond on the right side of L is bound with the benzene ring or any one of $R^1$, $R^2$, $R^3$ and $R^4$ in formula (A); and when L is bound with A, B, $R^1$, $R^2$, $R^3$ and $R^4$, then A, B, $R^1$, $R^2$, $R^3$ or $R^4$ with which L is bound represents a divalent group;

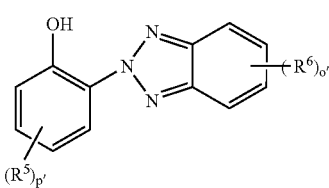

formula (B)

wherein in formula (B), $R^5$ and $R^6$ are respectively a hydrogen atom or a substituent; and p' and o' respectively denote an integer from 0 to 4:

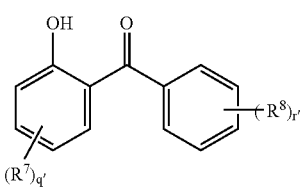

formula (C)

wherein in formula (C), $R^7$ and $R^8$ respectively represent a hydrogen atom or a substituent; and r' and q' respectively denote an integer from 0 to 4;

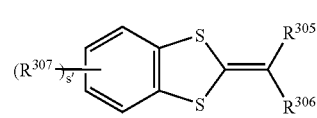

formula (D)

wherein in formula (D), $R^{305}$ and $R^{306}$ respectively represent a cyano group, a substituted or unsubstituted alkoxycarbonyl group, a substituted or unsubstituted carbamoyl group or a substituted or unsubstituted acyl group; $R^{307}$ represents a substituent; and s' denotes an integer from 0 to 4

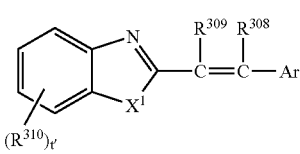

formula (E)

wherein in formula (E), $R^{308}$, $R^{309}$ and $R^{310}$ respectively represent a hydrogen atom, a cyano group, a substituted or unsubstituted alkoxycarbonyl group, a substituted or unsubstituted carbamoyl group or a substituted or unsubstituted acyl group; Ar represents a substituted or unsubstituted heterocyclic group or a substituted or unsubstituted aryl group; t' denotes an integer from 0 to 4; $X^1$ represents an oxygen atom, a sulfur atom or —N($R^{321}$)—; and $R^{321}$ represents a substituted or unsubstituted alkyl group or a substituted or unsubstituted aryl group;

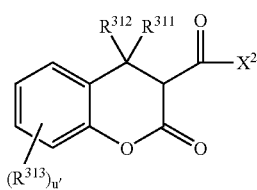
formula (F)

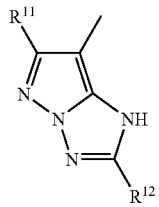
Formula (IV)

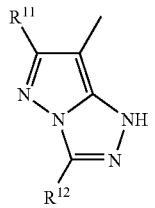
Formula (V)

wherein in formula (F), $R^{311}$ and $R^{312}$ respectively represent a hydrogen atom or a substituent; $X^2$ represents a substituted or unsubstituted alkoxy group, a substituted or unsubstituted aryloxy group or a substituted or unsubstituted amino group including an anilino group; $R^{313}$ is a hydrogen atom or a substituent; and u' is an integer from 0 to 4;

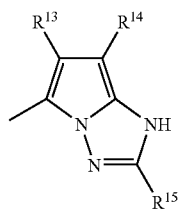
Formula (VI)

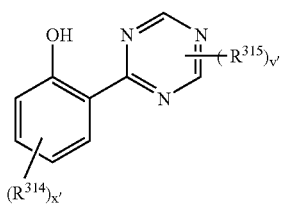
formula (G)

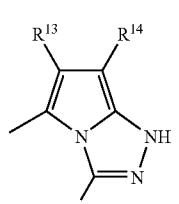
Formula (VII)

wherein in formula (G), $R^{314}$ and $R^{315}$ are respectively a substituent; v' denotes an integer from 0 to 4; and x' denotes an integer from 0 to 2.

2. The optical information recording medium of claim 1, wherein the maximum absorption wavelength of Dye in the dye represented by formula (I) is 450 nm to 900 nm.

3. The optical information recording medium of claim 1, wherein the maximum absorption wavelength of UV in the dye represented by formula (I) is 280 nm or more and less than 450 nm.

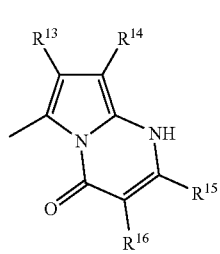
Formula (VIII)

4. The optical information recording medium of claim 1, wherein the medium is produced by applying with a spin-coating method a coating solution containing the dye represented by formula (I) and an organic solvent.

5. The optical information recording medium of claim 1, wherein UV represents a monovalent group derived from formula (A):

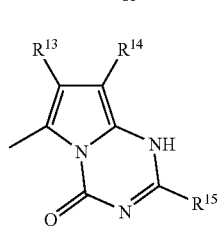
Formula (IX)

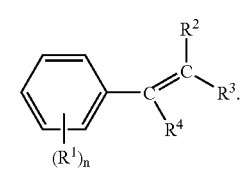
Formula (A)

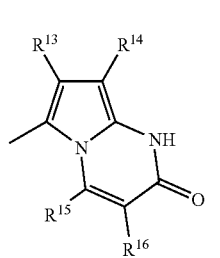
Formula (X)

6. The optical information recording medium of claim 5, wherein A in formula (II) is represented by any one of the following formulae:

-continued

Formula (XI)

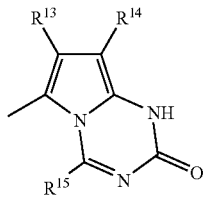

Formula (XII)

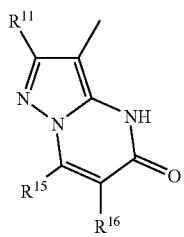

Formula (XIII)

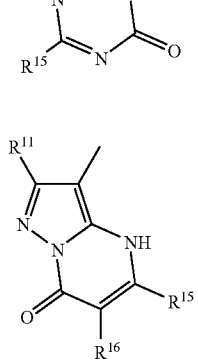

Formula (XIV)

Formula (XV)

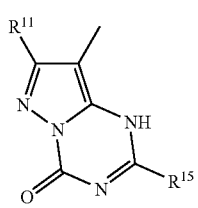

Formula (XVI)

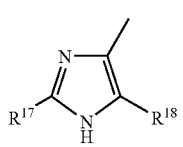

Formula (XVII)

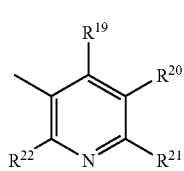

Formula (XVIII)

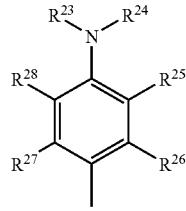

wherein $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ respectively represent a hydrogen atom or a substituent.

7. The optical information recording medium of claim 5, wherein B in formula (II) is represented by any one of the following structures:

(a)-1

(a)-2

(b)

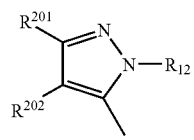

(c)

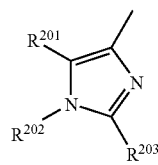

(d)

(e)

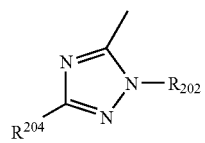

(f)

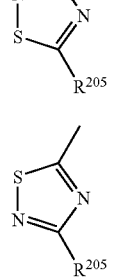

-continued (g)
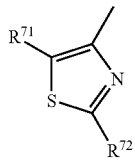

(h)
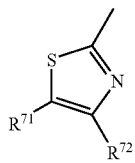

(i)
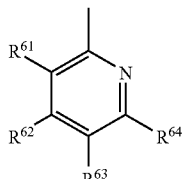

(j)
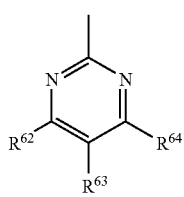

(k)
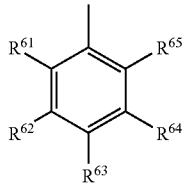

(l)
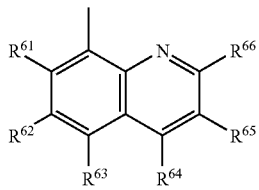

wherein $R^{61}$, $R^{62}$, $R^{63}$, $R^{64}$, $R^{65}$, $R^{66}$, $R^{71}$, $R^{72}$, $R^{201}$, $R^{202}$, $R^{203}$, $R^{204}$ and $R^{205}$ respectively represent a hydrogen atom or a substituent.

8. The optical information recording medium of claim 1, wherein Dye in formula (I) is represented by the following formula (α):

formula (α)

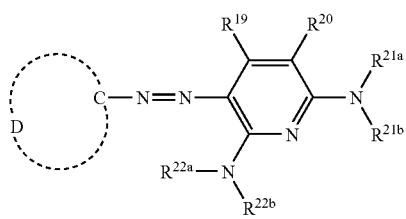

wherein in formula (α), D represents, together with a carbon atom to which D bonds, an atomic group necessary to form a hydrocarbon aromatic ring or a hetero ring; $R^{19}$ represents a substituted or unsubstituted alkyl group or a substituted or unsubstituted aryl group; $R^{20}$ represents a cyano group, a hydrogen atom, a substituted or unsubstituted alkoxycarbonyl group or a substituted or unsubstituted carbamoyl group; and $R^{21a}$, $R^{21b}$, $R^{22a}$ and $R^{22b}$ respectively represent a hydrogen atom, a substituted or unsubstituted alkyl group, a substituted or unsubstituted aryl group or a substituted or unsubstituted heterocyclic group.

9. The optical information recording medium of claim 1, wherein the dye represented by formula (I) is selected from the following dyes 1 to 25:

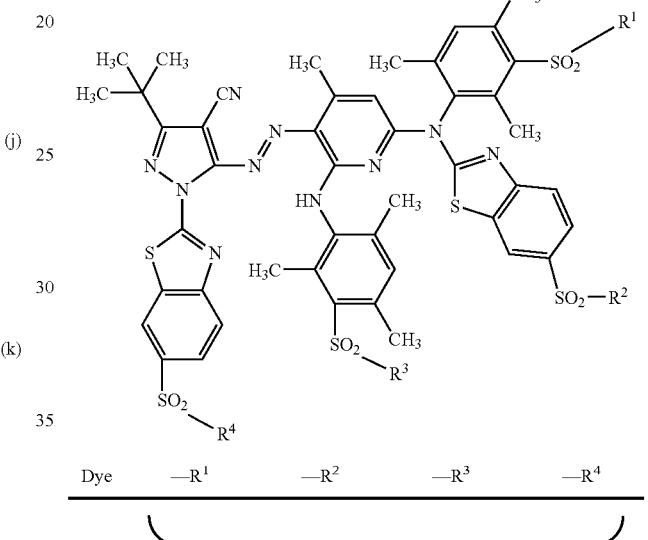

| Dye | —$R^1$ | —$R^2$ | —$R^3$ | —$R^4$ |
|---|---|---|---|---|

1. 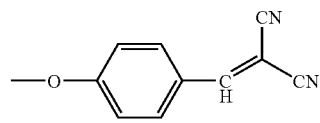

2. 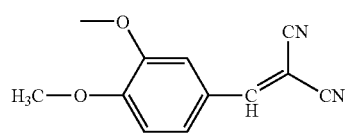

3. 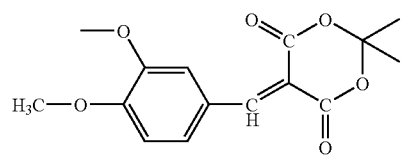

4. 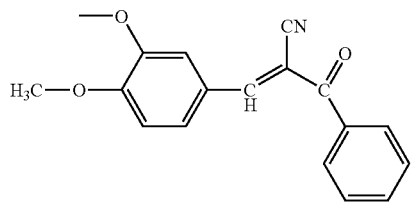

-continued
5. 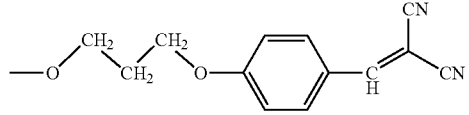
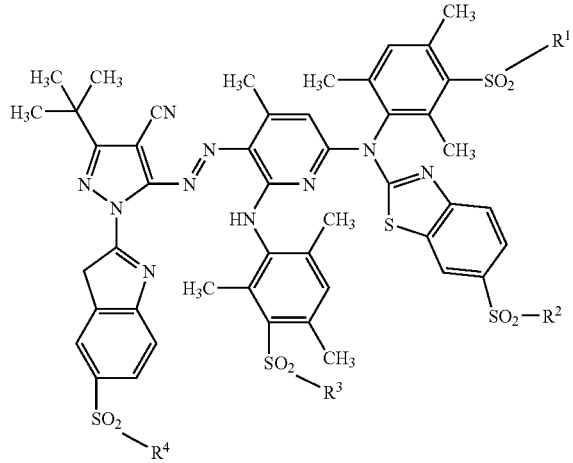
| Dye | —R¹ | —R² | —R³ | —R⁴ |
|-----|-----|-----|-----|-----|
6. 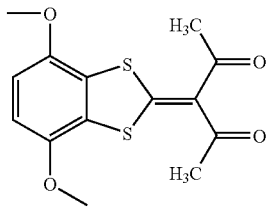
7. 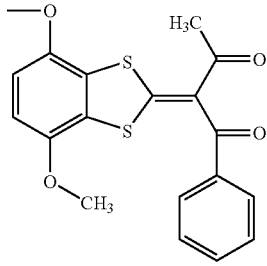
8. 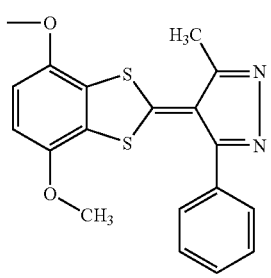
-continued
9. 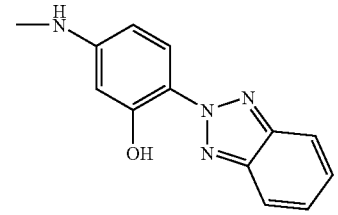
10. 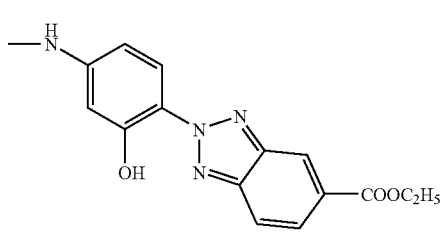
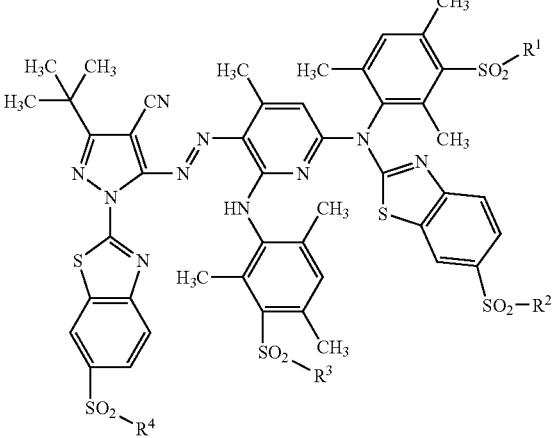
| Dye | —R¹ | —R² | —R³ | —R⁴ |
|-----|-----|-----|-----|-----|
11. 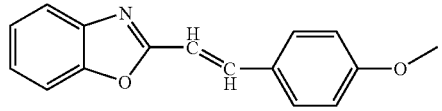
12. 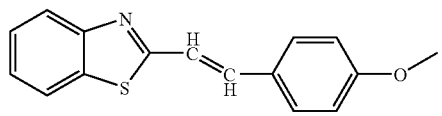
13. 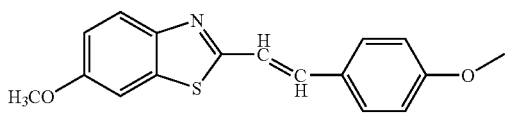
14. 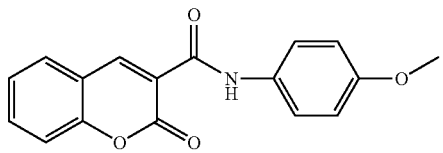

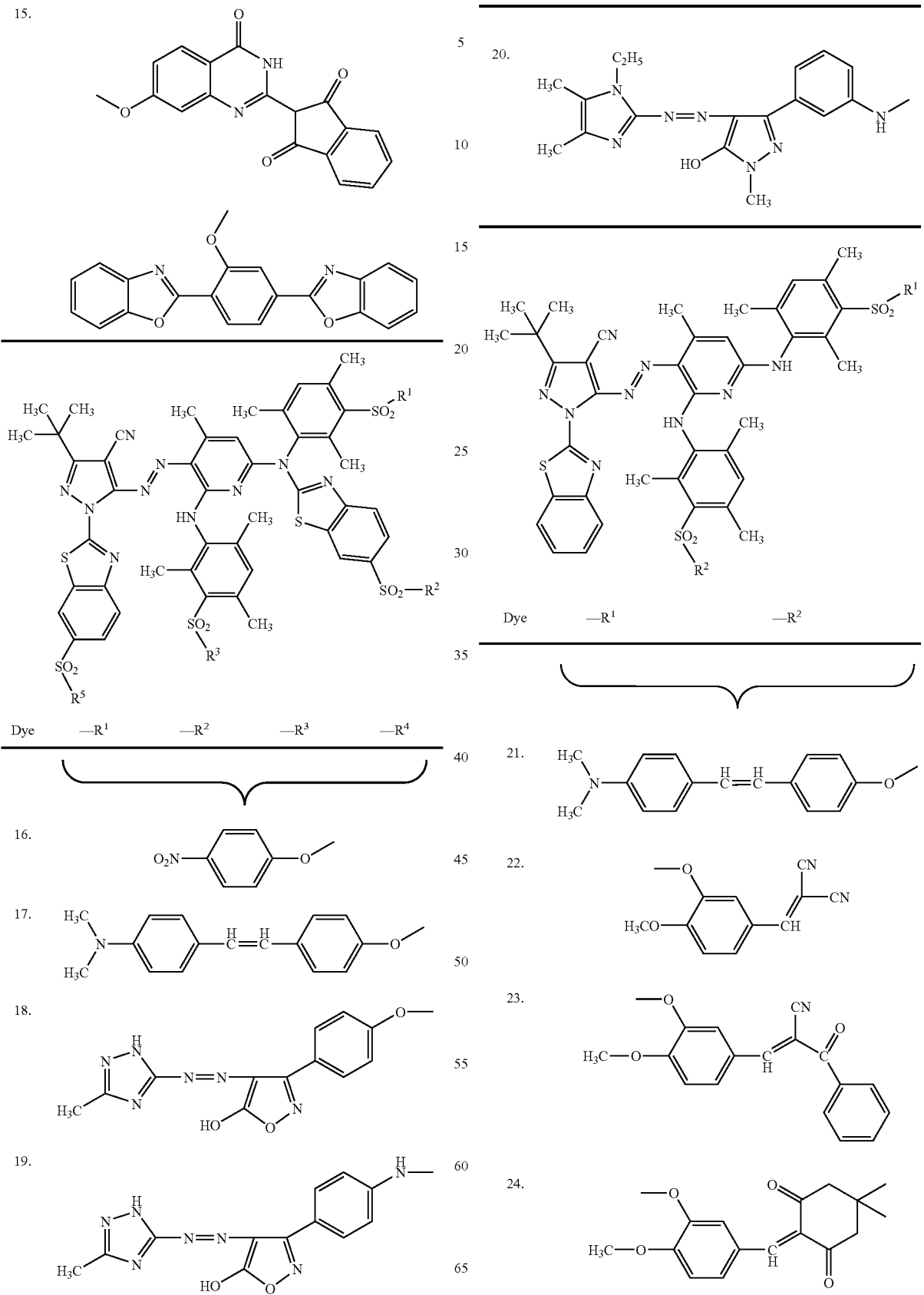

25. 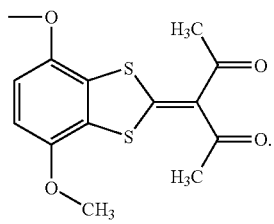
27. 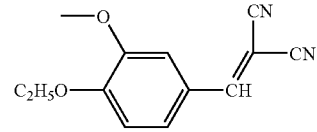
28.
10. The optical information recording medium of claim 1, wherein the dye represented by formula (I) is selected from the following dyes 26 to 30:
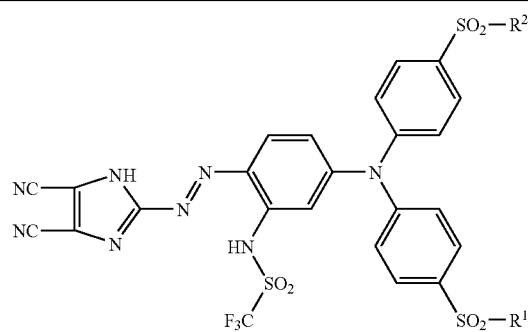
29. 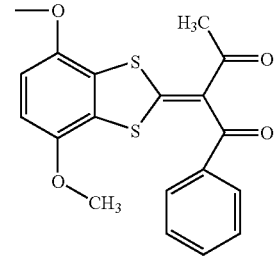
30.
26. 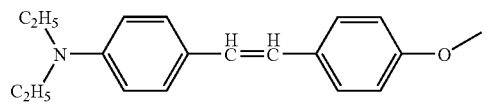
* * * * *